United States Patent
McDonald et al.

(10) Patent No.: US 9,581,330 B2
(45) Date of Patent: Feb. 28, 2017

(54) OXY-FUEL COMBUSTION OXIDANT HEATER INTERNAL ARRANGEMENT

(71) Applicant: Babcock & Wilcox Power Generation Group, Inc., Baberton, OH (US)

(72) Inventors: Dennis K. McDonald, Massillon, OH (US); Kiplin C. Alexander, Wadsworth, OH (US); David L. Kraft, Massillon, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 61 days.

(21) Appl. No.: 14/462,531

(22) Filed: Aug. 18, 2014

(65) Prior Publication Data

US 2014/0356793 A1 Dec. 4, 2014

Related U.S. Application Data

(63) Continuation-in-part of application No. 12/712,268, filed on Apr. 12, 2010, now Pat. No. 8,807,991, which is a continuation-in-part of application No. 12/169,168, filed on Jul. 8, 2008, now Pat. No. 8,327,809.

(60) Provisional application No. 60/948,784, filed on Jul. 10, 2007.

(51) Int. Cl.
| | | |
|---|---|---|
| *F23L 7/00* | (2006.01) | |
| *F23L 15/02* | (2006.01) | |
| *F23N 3/00* | (2006.01) | |
| *F28D 19/04* | (2006.01) | |
| *F23D 1/00* | (2006.01) | |

(52) U.S. Cl.
CPC ............... *F23L 7/007* (2013.01); *F23D 1/00* (2013.01); *F23L 15/02* (2013.01); *F23N 3/002* (2013.01); *F28D 19/044* (2013.01); *Y02E 20/344* (2013.01)

(58) Field of Classification Search
CPC .. F23D 1/00; F23D 1/005; F23L 7/007; F23L 15/02; F23N 3/002; F28D 19/044; Y02E 20/344; F23B 10/00
See application file for complete search history.

(56) References Cited

U.S. PATENT DOCUMENTS

| | | |
|---|---|---|
| 5,038,849 A | 8/1991 | Hagar |
| 5,915,340 A | 6/1999 | Cronin et al. |
| 6,202,574 B1 | 3/2001 | Liljedahl et al. |
| 6,581,676 B2 | 6/2003 | Fierle et al. |
| 6,640,752 B1 | 11/2003 | Counterman |
| 6,647,929 B1 | 11/2003 | Counterman |
| 6,974,318 B2 | 12/2005 | Ahn et al. |
| 7,082,987 B2 | 8/2006 | Counterman |
| 7,278,378 B2 | 10/2007 | Counterman |
| 2006/0090468 A1 | 5/2006 | Counterman |

*Primary Examiner* — Alfred Basichas
(74) *Attorney, Agent, or Firm* — Eric Marich; Christopher L. Smith

(57) ABSTRACT

A regenerative oxidant preheater internal arrangement, including a system and method for use thereof, utilizing a unique recycle oxy-combustion methodology which includes at least two primary combustion oxidant sectors placed adjacent to both the flue gas side as well as a secondary oxidant sector positioned between the two primary sectors. A tri-sector regenerative oxidant preheater apparatus, method and arrangement for utilization with oxy-fired pulverized coal combustion power plants.

21 Claims, 13 Drawing Sheets

Fan Power Comparison

Separate Primary and Secondary Heaters (SPSOH)

|  | ACFM | DP ("wg) | HP | kW |
|---|---|---|---|---|
| Primary | 40861 | 40.0 | 322.80 | 253.48 |
| FD | 224580.0 | 25 | 1108.86 | 870.75 |
| ID | 144230.8 | 40 | 1139.42 | 894.75 |
|  |  |  | TOTAL | 2018.98 |

Fan η  0.8
Motor η  0.95

CASE 1 Design

|  | ACFM | DP ("wg) | HP | kW | Power Savings (+) |
|---|---|---|---|---|---|
|  | 57571.0 | 40.0 | 454.81 | 357.15 |  |
|  | 180896.2 | 25 | 893.17 | 701.38 |  |
|  | 146730.0 | 40.0 | 1159.17 | 910.25 |  |
|  |  |  | TOTAL | 1968.78 | 50.21 |

FIG. 19

OXY-FUEL COMBUSTION OXIDANT HEATER INTERNAL ARRANGEMENT

RELATED APPLICATION DATA

This application is a continuation-in-part of and claims priority to U.S. patent application Ser. No. 12/712,268 filed Apr. 12, 2010, now U.S. Pat. No. 8,807,991, issued on Aug. 19, 2014, and titled "Oxy-Fuel Combustion Oxidant Heater Internal Arrangement," which itself is a continuation-in-part of and claims priority to U.S. patent application Ser. No. 12/169,168, filed Jul. 8, 2008, now U.S. Pat. No. 8,327,809, issued on Dec. 11, 2012, and titled "Tri-Sector Regenerative Oxidant Preheater for Oxy-Fired Pulverized Coal Combustion," which itself claims priority to and is a non-provisional of U.S. Provisional Patent Application No. 60/948,784 filed Jul. 10, 2007 and titled "Method of Reducing Airheater Leakage for Oxycombustion Power Plant." The complete texts of all of these patent applications are hereby incorporated by reference as though fully set forth herein in their entireties.

FIELD AND BACKGROUND OF THE INVENTION

The present invention relates, in general, to the field of oxidant heaters (air heaters and air pre-heaters) for use in coal-fired power plants and in particular to a system and method for use in oxy-fuel combustion which incorporates a novel regenerative oxidant preheater internal sector arrangement as well as the strategic positioning of the primary oxidant fan and primary oxidant mixer. The present invention relates in part to minimizing the loss of oxygen through leakage of oxidant into the gas side of a rotary regenerative oxidant preheater.

Air quality laws, both at the federal and state level have set increasingly stringent emission standards.

Often of particular concern are sulfur dioxide and other acidic gases produced by the combustion of fossil fuels and various industrial operations. Acidic gases are known to be hazardous to the environment, such that their emission into the atmosphere is closely regulated by clean air statutes.

New technologies are addressing this problem so that fossil fuels and particularly coal can be utilized for future generations without polluting the atmosphere and contributing to global warming. One of the technologies being developed has potential for retrofit to existing pulverized coal plants, which are the backbone of power generation in many countries. This technology is oxy-fuel combustion which is the process of firing a fossil-fueled boiler with an oxygen-enriched gas mix instead of air. Almost all the nitrogen is removed from the input air, yielding a stream that is approximately 95 percent oxygen. Firing with pure oxygen would result in too high a flame temperature, so the mixture is diluted by mixing with recycled flue gas. Oxy-fuel combustion produces approximately 75 percent less flue gas than air fueled combustion.

About 70 percent to 80 percent of the flue gas exiting the wet scrubber of an oxy-fired pulverized coal combustion plant is returned to the boiler where oxygen is introduced to produce the combustion oxidant gas, while the remainder of the flue gas is sent to a purification and compression system where it is prepared to suit pipeline and storage requirements. Thus, it is imperative that the carbon dioxide concentration be as high as possible with a low concentration of sulfur, nitrogen, oxygen, and water as can be practically and economically achieved.

Oxy-fired pulverized coal combustion burns pulverized coal in an oxidant comprised of a mixture of relatively pure oxygen and recycled flue gas to reduce the net volume of flue gases generated from the combustion process in a boiler, and to substantially increase the concentration of carbon dioxide in the flue gases. The recycled flue gas represents a portion of the flue gases generated by the combustion process and acts to dilute the flame temperature and maintain the volume necessary to ensure adequate convective heat transfer to all boiler areas, and can also be used to dry and carry the pulverized coal to the combustion space of the boiler.

The oxidant used in oxy-fired pulverized coal combustion is, in one non-limiting instance, heated in rotary regenerative type air preheaters, even though such air preheaters encounter leakage from the air side to the gas side. Tubular and plate type air preheaters do not experience leakage and provide a reasonable alternative to the rotary regenerative air preheater at industrial boiler scale. However, this is not a cost effective alternative at the electric utility boiler scale.

In conventional pulverized coal firing, a small portion of the air required for combustion is used to dry and carry the pulverized coal to the burners for burning the coal in the furnace or combustion space of the boiler. This portion of the air is known as primary air. In direct firing systems, primary air is also used to dry the coal in the pulverizer. The remainder of the combustion air is introduced in a windbox housing the burners, and is known as secondary air.

Rotary regenerative air preheaters are relatively compact and are the most widely used type for combustion air preheating in electric utility boiler plants. Rotary regenerative air preheaters transfer heat indirectly by convection as a heat storage medium is periodically exposed to heat-emitting flue gases and heat-absorbing combustion air. The rotary regenerative air preheater includes a cylindrical shell or housing that contains a coaxial rotor packed with metal heat storing corrugated plates which are bundled so as to present flow passageways therebetween. The preheater is divided into a gas side which is under negative pressure and an air side which is under positive pressure. The most prevalent flow arrangement has the flue gases entering the top of the rotor and the combustion air entering the bottom of the rotor in counter flow fashion. Consequently, the cold air inlet and the cooled gas outlet are at one end of the preheater, usually referred to as the cold end, the hot gas inlet and the heated air outlet are at the opposite end of the preheater, usually referred to as the hot end. As a result, an axial temperature gradient exists from the hot end of the rotor to the cold end of the rotor. In response to this temperature gradient, the rotor tends to distort and to assume a shape similar to that of an inverted dish, commonly referred to as rotor turndown.

In operation, the rotor is rotated slowly about a central shaft, making one to three revolutions per minute causing each bundle of heat absorbing plates to be placed, alternately, into the flow path of the heat-emitting flue gases and the flow path of the heat-absorbing combustion air. The most notable characteristic of rotary regenerative air preheaters is that a small but significant amount of air leaks from the positive pressure air side to the negative pressure gas side due to rotor turndown and the rotary operation of the air preheater. In order to prevent undue leakage from the air side to the gas side, the air preheater is provided with radial, axial and peripheral seals. It is known to construct these seals of thin, flexible metal. The seals are adjusted when the gaps are the largest. This means that, when the gaps are small due to expansion of the rotor and the housing, the seals may be severely bent and forced into high contact pressure with the rotor or housing. For this reason, seals wear relatively quickly and require replacement.

In a prior art or conventional regenerative air or oxidant preheater arrangement, the primary air or oxidant is at a positive pressure of about 40 inches of water gage ("inches wg"), the secondary air or oxidant is at a positive pressure of about 20 inches wg, and the flue gas is at a negative pressure of about 5 inches wg. This conventional air or oxidant preheater has the air or oxidant side of the preheater divided into three sectors, a central sector which receives the primary air or oxidant and is flanked by a pair of sectors which receive the secondary air or oxidant and are located adjacent the flue gas side portion of the preheater. This arrangement minimizes the pressure difference across the seals between the air or oxidant side and the gas side to about 25 inches wg, which results in 7 percent to 14 percent leakage of air or oxidant into the flue gas. These values, though representative of a coal fired plant, may vary depending on fuel and equipment variations and are not intended as absolute.

In an oxy-fired pulverized coal plant the combustion process is carried out by the oxidant, which is comprised of a mixture of relatively pure oxygen and recycled flue gas, with a portion thereof being used to dry and transport the pulverized coal to the burners and the remainder being introduced into the boiler combustion space. The oxidant must be heated before entering the combustion process, and the equipment of choice is a rotary regenerative air preheater since it is cost effective for electric utility power plants. However, the leakage occurring in the regenerative oxidant preheater from the positive pressure oxidant to the negative pressure flue gas represents a loss of oxygen and recycled flue gas to the gas side of the regenerative oxidant preheater. This loss of oxygen along with the recycle gas requires additional oxygen production in an air separation unit to make up for the loss of oxygen, and it also requires the removal of the leaked oxygen from the product gas in a compression and purification unit before the concentrated carbon dioxide can be disposed of via storage or use for enhanced oil recovery, since pipeline line and use constraints require that the flue gas be as high in concentration of carbon dioxide and as low in concentration of nitrogen, sulfur, oxygen and water, as practical. Both of these remedial procedures result in increased plant operating costs. Thus, oxidant introduction into the flue gas must be minimized or eliminated. Furthermore, it is undesirable for an oxidant with a high concentration of oxygen to be exposed to ash potentially containing some combustible carbon and thereby raising the concern of fire.

In one process variation, warm recycle, the flue gas leaving the oxidant preheater is immediately split into two streams. One stream passes through particulate, $SO_2$, and moisture removal as described herein, before being further split between the primary and exit stream to a CPU. The other, secondary stream, passes through particulate removal, and is routed back to the oxidant preheater in a "warm" state (about 400° F.).

Regenerative oxidant heaters transfer heat indirectly by convection as a heat storage medium is periodically rotated into the hotter and cooler flow streams. In steam generating plants, tightly packed bundles of corrugated steel plates serve as the storage medium. In these units either the steel plates, or surface elements, rotate through oxidant (or air) and gas streams, or rotating ducts direct oxidant and gas streams through stationary surface elements.

The conventional regenerative oxidant preheater which is most commonly used is the Ljungstrom® type which features a cylindrical shell plus a rotor which is packed with bundles of heating surface elements which are rotated through counterflowing oxidant and gas streams. FIG. 1 shows the typical positioning of the sectors through which the primary oxidant stream 58 and secondary oxidant stream 34 as well as the counterflowing flue gas stream 98 flows in a conventional Ljungstrom® type regenerative oxidant heater. As is shown, oxidant flows through one half of the rotor and flue gas which comes from the boiler's gas exit flows through the other half. Additionally, the oxidant side (or "air side") consists of two sectors, one for the primary stream and one for the secondary stream.

Another common conventional regenerative oxidant preheater sector arrangement includes that which is disclosed in United States Patent Application Publication No. 2006/0090468. The regenerative oxidant preheater of United States Patent Application Publication No. 2006/0090468 is adapted to receive a flow of cool oxidant in counterflow to the flow of hot flue gas and to provide a heat exchange between the cool oxidant and the hot flue gas to convert the cool oxidant into the heated combustion oxidant. FIG. 2 is a bottom cross sectional view of the rotor of an oxidant preheater with a typical sector arrangement, which is also employed in United States Patent Application Publication No. 2006/0090468. It shows the primary oxidant sector 40, and the secondary oxidant sector 42, through which respective primary and secondary oxidant streams flow toward a boiler. The primary and secondary sectors 40 and 42, respectively, are separated by a sector plate 44 and they are both adjacent to flue gas sector 38, through which flue gas flows away from a boiler. Additionally, the primary and secondary sectors 40 and 42 are separated from the flue gas sector 38 by sector plates 46 and 48.

In conventional regenerative oxidant heaters for an air-fired power plant, a typical pressure for the primary oxidant stream is high as compared with that of both the secondary air stream and the flue gas stream. For example, a typical pressure for the primary oxidant stream is about +40 inches wg, for the secondary oxidant stream it is about +20 inches wg, and for the flue gas stream from the boiler it is about −5 inches wg. Thus, between the secondary air sector and gas side there is about a +25 inches water gauge difference in air pressure which can result in 14 percent leakage of the oxidant into the gas side. Furthermore, the pressure gradient between the primary air sector and the gas side is much greater.

In all regenerative heaters which use conventional sector arrangements such as those discussed above, the rotating heat exchanger in combination with the pressure differential between the respective streams causes inherent leakage between the air (or oxidant) side and the gas side conveying the hot flue gas from the boiler.

However, in oxy-fuel combustion, all these configurations result in leakage from the oxidant to the gas side. In addition most of the oxygen must be added to the recycled flue gas upstream of the oxygen preheater in order to achieve a reasonable flue gas temperature leaving the oxidant heater. Thus any leakage results in the loss of costly oxygen along with recycle gas to the exit stream thereby necessitating additional oxygen production in an air separation unit (ASU) to make up for the loss as well as removal of additional oxygen from the product gas in a compression and purification unit (CPU) before the concentrated $CO_2$ can be disposed of. A need exists to minimize such leakage as the cost of additional oxygen production and removal is prohibitive.

An additional problem encountered when using an oxidant preheater employing a conventional sector arrangement in oxy-fuel combustion, is difficulty achieving acceptable exit gas temperature. Due to the high temperatures of the flue gas and oxidant streams, it can be very difficult, especially evident in warm recycle, to achieve an acceptable gas temperature at the oxidant preheater exit.

Furthermore, the concern about costly oxygen loss as well as the problem caused by the high temperature of the oxidant(s) and flue gas makes it difficult to achieve a design that balances both acceptable heat exchanges within the oxidant preheater as well as reasonable oxidant preheater exit gas temperatures.

When attempting to achieve such a balance, a typical known step is to add cool oxidant to the oxidant flow stream(s) prior to (i.e., upstream from) the oxidant heater. However, this conventional method is undesirable because leakage from the oxygenated oxidant stream(s) into the boiler flue gas stream results in the loss of costly oxygen. The loss of oxygen occurs because a substantial portion of it will flow in the stream which leads to the compression process. Additionally, if the oxygen is added to the primary or secondary oxidant stream after the oxidant preheater an acceptable oxidant preheater design becomes more difficult to achieve.

Another common approach which has been taken in an attempt to reduce leakage and hence loss of costly oxygen, is to locate the primary oxidant fan downstream of the oxidant heater. However, this approach has consistently been ineffective.

Additionally, a known alternative to using a regenerative oxidant preheater in order to eliminate internal leakage and avoid loss of costly oxygen, is to use expensive separate primary and secondary tubular or plate type preheaters for the secondary and primary oxidant streams which completely separates the oxidant side and the gas side allowing no leakage. However, although this alternative may be reasonable for use on the industrial boiler scale in air fired applications, it is not cost effective when applied to large utility boilers. Additionally, separate tubular preheaters require considerably more space than regenerative oxidant heaters and tubular preheaters are susceptible to significant internal leakage with age, thus inevitably resulting in oxidant loss.

Accordingly there is a clear need for a cost effective system and method which incorporates a regenerative oxidant preheater design that will minimizes the loss of costly oxygen normally caused by internal oxidant preheater leakage and which will also achieve an acceptable balance between reasonable heat exchange within the oxidant preheater and a reasonable oxidant preheater exit flue gas temperature.

SUMMARY OF THE INVENTION

The present invention provides an apparatus, method and arrangement of a tri-sector rotary regenerative oxidant preheater which includes a stationary housing and a rotor rotatably mounted in the housing. Sector plates are located at the axial ends of the rotor and divide the preheater into a flue gas sector, a secondary oxidant sector, and two primary oxidant sectors. The secondary oxidant sector is interposed between the two primary oxidant sectors.

During operation of the preheater, the environments in the flue gas sector and the primary oxidant sectors of the preheater are at a negative pressure of about 5 inches wg, and the secondary oxidant sector of the preheater is at a positive pressure of about 20 inches wg.

One of the two primary oxidant sectors borders the three o'clock side of the flue gas sector, while the other primary oxidant sector borders the nine o'clock side of the flue gas sector. Since the operating environments of the flue gas sector and the two primary oxidant sectors are at about the same negative pressure, there is very limited leakage between the oxidant side and the gas side of the preheater.

The secondary oxidant sector is located between the two primary oxidant sectors. Since the operating environments of the primary oxidant sectors are a negative pressure of about 5 inches wg, and the operating environment of the secondary oxidant sector is a positive pressure of about 20 inches wg, there will be a pressure difference of about 25 inches between the primary oxidant sectors and the secondary oxidant sector, but any leakage will be that of the secondary oxidant to the primary oxidant and therefore there will be no loss of secondary oxidant to the gas side of the preheater.

In one embodiment of the invention, the preheater rotor rotates in a clockwise direction. In this embodiment, the primary oxidant sector which borders the three o'clock side of the flue gas sector is normally larger than the primary oxidant sector which borders the nine o'clock side of the flue gas sector, and is sized to deliver the required primary oxidant temperature. The primary oxidant sector which borders the nine o'clock side of the flue gas sector is normally smaller than the primary oxidant sector bordering the three o'clock side of the flue gas sector and is sized for the minimum required to substantially preclude the leakage of oxidant into the flue gas sector. The secondary oxidant sector which is interposed between the two primary oxidant sectors is sized to deliver the required secondary oxidant temperature.

In another embodiment of the invention, the preheater rotor rotates in a counterclockwise direction. In this embodiment, the primary oxidant sector which borders the nine o'clock side of the flue gas sector is normally larger than the primary oxidant sector which borders the three o'clock side of the flue gas sector, and is sized to deliver the required primary oxidant temperature. The primary oxidant sector which borders the three o'clock side of the flue gas sector is normally smaller than the primary oxidant sector bordering the nine o'clock side of the flue gas sector and is sized for the minimum required to substantially preclude the leakage of oxidant into the flue gas sector. The secondary oxidant sector which is interposed between the two primary oxidant sectors is sized to deliver the required secondary oxidant temperature.

In still another embodiment of the invention, the preheater rotor is rotatable in either a clockwise or counterclockwise direction. One of the two primary oxidant sectors borders the three o'clock side of the flue gas sector and the other primary oxidant sector borders the nine o'clock side of the flue gas sector. Both primary oxidant sectors are sized, so as together, to deliver the required primary oxidant temperature. The secondary oxidant sector which is interposed between the two primary oxidant sectors are substantially of equal size, and are sized to deliver the required secondary oxidant temperature.

Another aspect of the present invention is drawn to an oxy-fired pulverized coal combustion power plant which includes a boiler. A boundary wall forms a combustion space within the boiler. A burner wall is formed in the boundary wall and spaced therefrom to form a windbox therebetween. A burner port is formed in the boundary wall, and a coal burner nozzle is provided which discharges through the port into the boiler combustion space. A coal pulverizer and a conduit which supplies coal to the pulverizer to be pulverized therein are provided. A tri-sector rotary regenerative oxidant preheater has sector plates which divide the preheater into a flue gas sector, two primary oxidant sectors, and a secondary sector interposed between the two primary oxidant sectors. A duct delivers hot flue gases from the boiler to the preheater. A forced draft fan is located upstream flow-wise of the preheater and supplies secondary oxidant to the preheater to be heated as it passes through the secondary sector of the preheater. A duct conveys the heated secondary oxidant to the windbox. A primary oxidant fan is located downstream of the preheater and draws the primary oxidant through the two primary oxidant sectors to be heated as it passes therethrough. A duct conveys the heated primary oxidant to the pulverizer. The heated primary oxidant sweeps and dries the pulverized coal and carries it through a conduit to the coal burner nozzle which mixes the pulverized coal and heated primary oxidant with the heated secondary oxidant to establish a stable flame in the boiler combustion space.

The oxy-fired pulverized coal combustion power plant includes a main oxygen mixer is operatively located upstream oxidant flow-wise of the forced draft fan.

In one embodiment, the oxy-fired pulverized coal combustion power plant includes a secondary oxygen mixer operatively located between the forced draft fan and the tri-sector rotary regenerative oxidant preheater.

In another embodiment, the oxy-fired pulverized coal combustion power plant includes a secondary oxygen mixer operatively located between the tri-sector rotary regenerative oxidant preheater and the boiler windbox.

Further, it is an object of the present invention to provide a cost effective system and method for use in oxy-fuel combustion which allows a regenerative oxidant preheater design; which minimizes the loss of costly oxygen typically caused by internal leakage between the air and gas sides of a regenerative oxidant preheater; and which simultaneously aids in achieving a balance between acceptable heat exchange within the oxidant preheater and reasonable oxidant preheater exit gas temperatures. Another object of the present invention is to significantly reduce overall power plant operating cost as compared with those plants which use separate preheaters and/or tubular air preheater designs. It is yet another object of the present invention to improve the gas composition to the boiler by reducing the total amount of sulfur and moisture in the recycle combustion oxidant which is returned to the boiler via primary and secondary oxidant recycle streams.

To achieve its objectives and eliminate the problems of the prior art, the system and method of the present invention employs an unconventional and novel regenerative oxidant preheater internal sector arrangement which utilizes leakage from a primary combustion oxidant stream (or "recycle gas stream") having a low oxygen content, into both a flue gas stream which flows out from a boiler's gas exit, as well as into an oxygenated secondary combustion oxidant stream which flows toward the boiler.

A oxidant preheater internal sector arrangement according to one embodiment of the present invention comprises a flue gas side consisting of a sector, through which a flue gas stream flows away from a boiler's gas exit; and a counterflowing combustion oxidant side which comprises at least one secondary combustion oxidant sector through which an oxygenated secondary combustion oxidant stream flows toward the boiler as well as at least two primary combustion oxidant sectors through which a cold primary combustion oxidant stream, which has a relatively low oxygen content (i.e., roughly equivalent to the oxygen concentration of the flue gas stream), flows toward the boiler.

In addition to an oxidant preheater with the aforementioned sector arrangement, a system according to one embodiment of the present invention comprises a primary oxidant fan, which feeds primary oxidant flow to the oxidant preheater positioned upstream of the oxidant preheater as well as a primary oxidant mixer, positioned downstream of the oxidant preheater, which introduces an oxidant (i.e., oxygen or air) into the primary combustion oxidant stream.

Furthermore, a method according to one embodiment of the present invention comprises the first step of providing an oxidant preheater having the aforementioned internal sector arrangement. Before it enters the oxidant preheater on its way to the boiler, the cold primary oxidant stream, which has a static gas pressure greater than the pressure of both the secondary combustion oxidant and flue gas streams, is split up and then directed to flow through the at least two separate primary combustion oxidant sectors.

Additionally, the method of one embodiment of the present invention disclosed herein comprises the further step of allowing the cold primary combustion oxidant to leak into both a flue gas sector and into at least one secondary combustion oxidant sector as it flows through the oxidant heater. In this embodiment flow to the primary oxidant fan is increased to provide additional primary oxidant flow to the oxidant preheater for the purpose of making up the portion of flow lost as a result of the leakage into the flue gas and secondary combustion oxidant streams. This embodiment provides an additional unexpected benefit especially beneficial in warm recycle embodiments. By increasing oxidant flow (via primary fan), the demand on the secondary fan is reduced, thereby enabling an overall power saving by virtue of the increased volumetric flow of the cooler denser gas to the primary fan, and a decrease of volumetric flow of the warmer lighter/less dense gas operatively conveyed by the secondary fan. A final step of a method according to one embodiment of the present invention is introducing oxidant into the primary stream at a location downstream from the oxidant heater.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a various embodiments of the invention are illustrated.

BRIEF DESCRIPTION OF THE DRAWINGS

FIG. 19 is a table diagram of data relating to an embodiment of the present invention.

DESCRIPTION OF THE INVENTION

Reference will hereinafter be made to the accompanying drawings wherein like numerals designate the same or functionally similar elements throughout the various figures. The present invention resides in reducing oxidant leakage from the oxidant side to the gas side of a rotary regenerative oxidant preheater.

Figure 1:
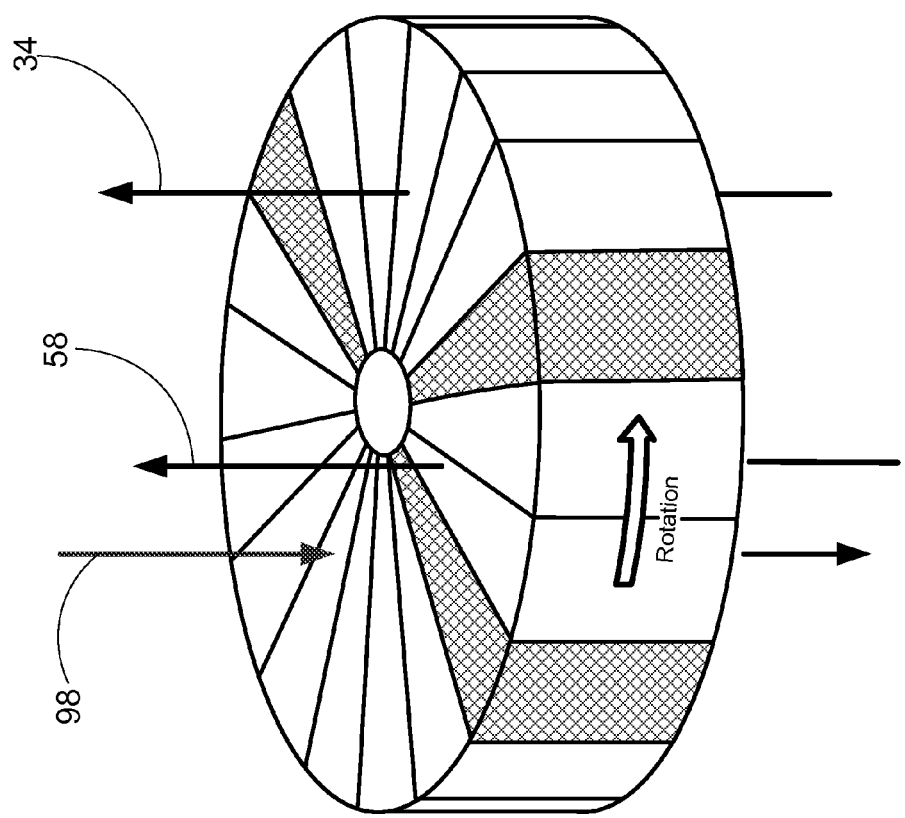
FIG. 1 is a perspective view of the rotor in a conventional Ljungstrom® type regenerate oxidant preheater which shows the typical positioning of the sectors through which the primary and secondary oxidant streams, as well as the flue gas stream flow.
Figure 2:
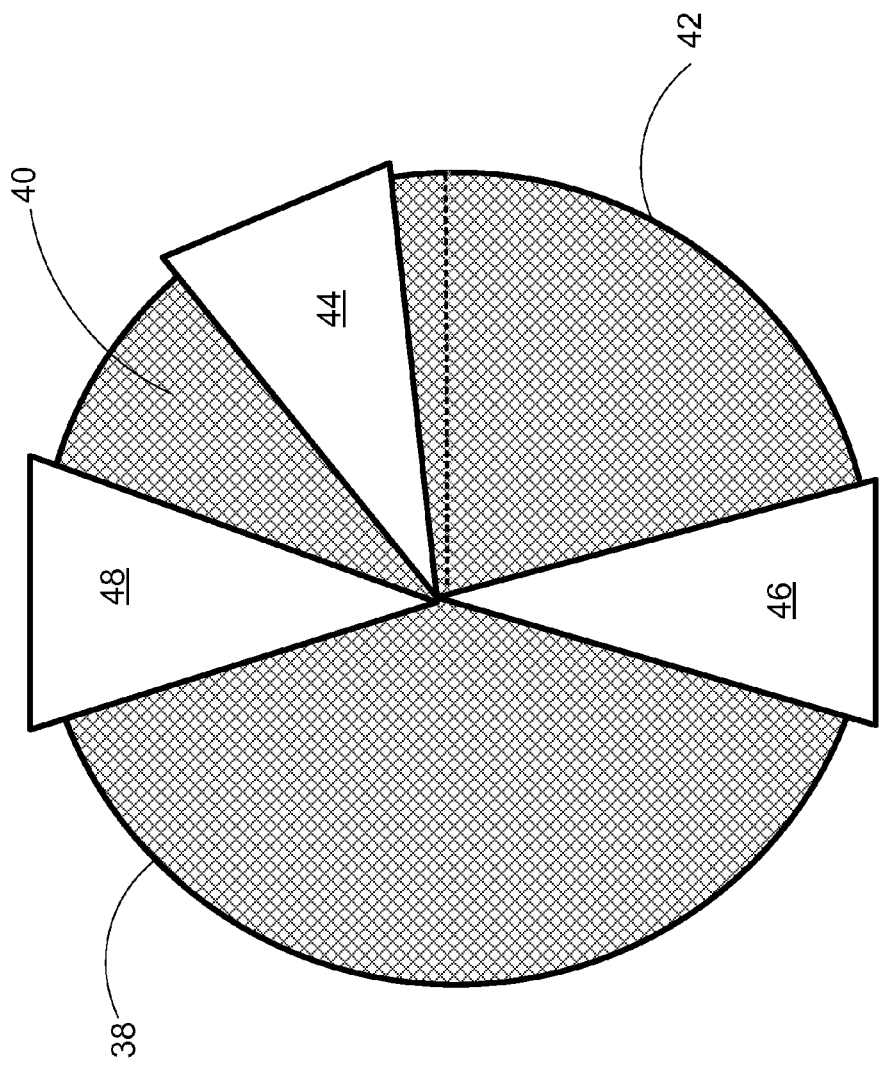
FIG. 2 is a cross sectional view of another conventional regenerative oxidant preheater sector arrangement as laid out in United States Patent Application Publication No. 2006/0090468 which illustrates the positioning of the primary, secondary and flue gas sectors.
Figure 3:
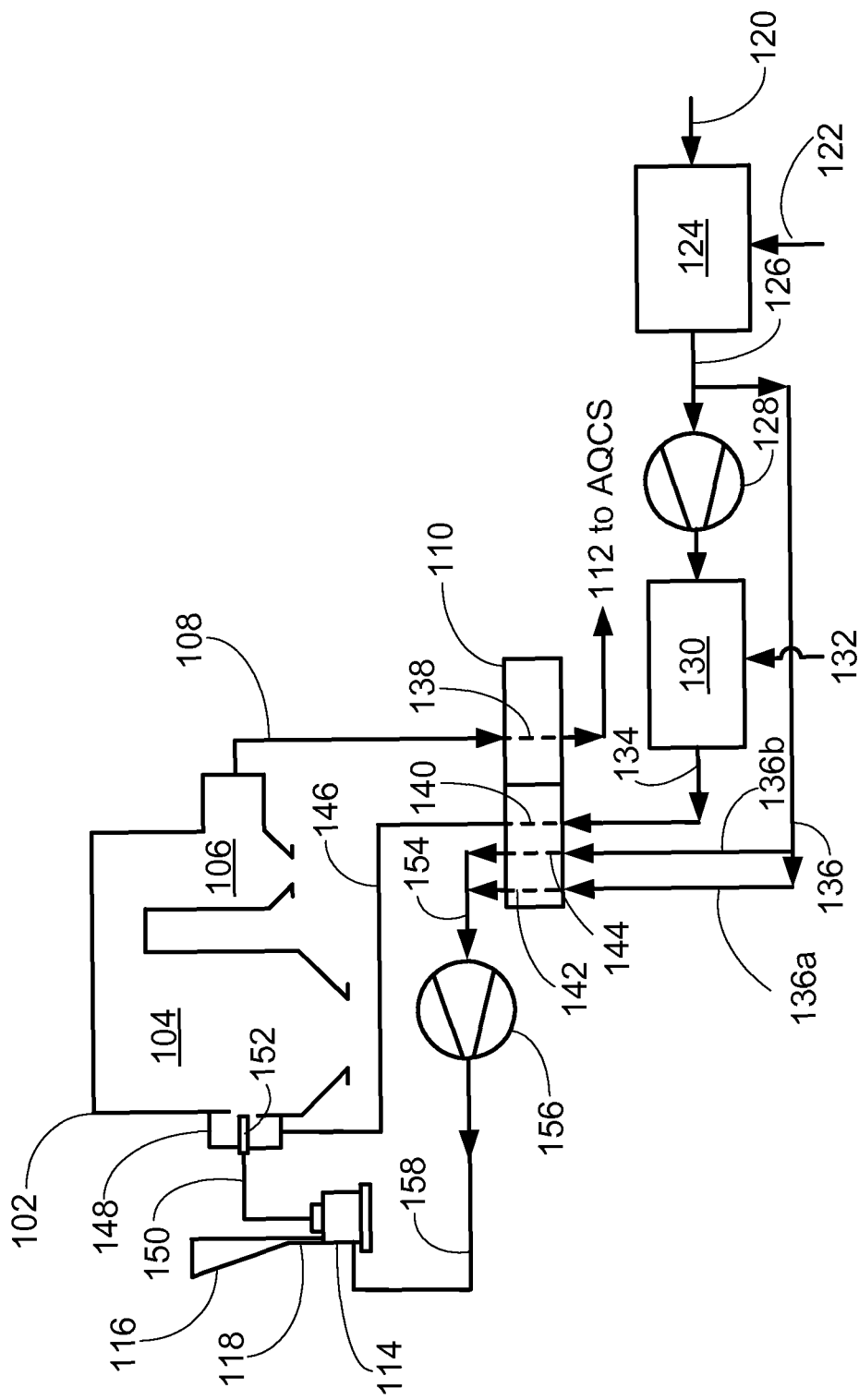
FIG. 3 is a flow diagram of an oxy-fired pulverized coal combustion system including a secondary oxygen mixer located upstream oxidant flow-wise of a tri-sector regenerative oxidant preheater.
Figure 4:
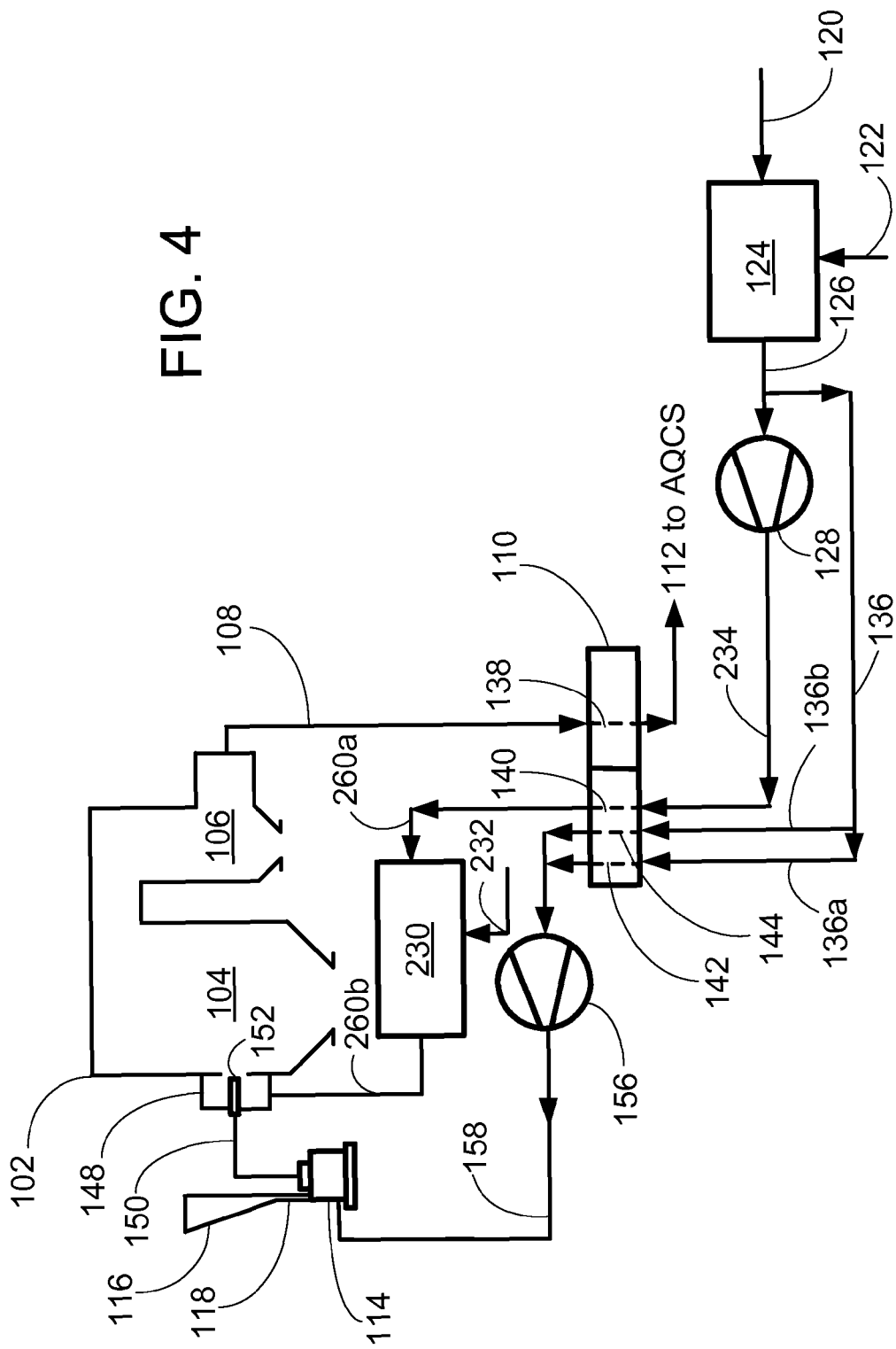
FIG. 4 is a flow diagram of an oxy-fired coal combustion system including a secondary oxygen mixer located downstream oxidant flow-wise of a tri-sector regenerative oxidant preheater.

Referring to FIGS. 3 and 4, there is shown a flow diagram of an oxy-fired coal, or pulverized coal, combustion system including a secondary oxygen mixer located upstream oxidant flow-wise of a tri-sector regenerative oxidant preheater. As used herein, the term "tri-sector regenerative oxidant preheater" refers to the fact that the oxidant side (e.g., 539, 1139, 1239, 1339 and/or 1439) of the various embodiments of the present invention's oxidant preheater contains at least three discrete sectors (as those of sill in the art will come to understand some embodiments may contain four, or even five, discrete sectors on the oxidant side (e.g., 1339 and/or 1439)). Should one want to consider the flue gas side, or sector, the present invention could be termed a quad-sector regenerative oxidant preheater (or even a penta-sector, or hexa-sector regenerative oxidant preheater). Specifically, FIGS. 3 and 4 illustrate a tri-sector regenerative oxidant preheater for heating the primary and secondary oxygen enriched flue gas, hereinafter referred to as an oxidant. A boiler is generally shown at 102 and includes a combustion space 104. Coal is supplied to a pulverizer 114 from a coal delivery system which includes a coal bunker 116 discharging coal into pulverizer 114 through a conduit 118.

The oxidant delivery system includes a main oxygen mixer 124 which receives a recycled flue gas 120 resulting from the coal combustion process and an oxygen stream 122 which has a purity of at least about 95 percent or more. The oxygen enriched flue gas or oxidant stream is conveyed through ductwork 126. A greater portion of the oxidant stream represents the secondary oxidant and is delivered to the suction side of a forced draft fan 128, while the remainder of the oxidant stream represents the primary oxidant and is delivered to ductwork 136.

The primary oxidant is conveyed through ductwork 136 and split into two portions via ductwork 136a and 136b so as to convey two portions of primary oxidant to tri-sector regenerative oxidant preheater 110 where, as also shown in FIGS. 5 through 8, it is heated as it passes through primary oxidant sectors 142 and 144 of preheater 110. The heated primary oxidant streams exiting sections sectors 142 and 144 of preheater 110 are conveyed to a common ductwork 154 and delivered to the suction side of a primary oxidant fan 156. The primary oxidant exiting fan 156 is conveyed through ductwork 158 to pulverizer 114 where it dries and sweeps the pulverized coal and carries it through a conduit 150 to burner 152 which mixes the pulverized coal and primary oxidant with the secondary oxidant to establish a stable flame in combustion space 104.

The secondary oxidant exiting forced draft fan 128 is conveyed to a secondary oxygen mixer 130, wherein the secondary oxidant is further enriched with an oxygen stream 132. The further enriched secondary oxidant is conveyed to tri-sector regenerative oxidant preheater 110 via ductwork 134 where, as also shown in FIGS. 5 through 8, it is heated as it passes through sector 140 of preheater 110. The heated secondary oxidant exiting sector 140 of preheater 110 is conveyed through ductwork 146 to a windbox 148 which houses the one or more coal burners, such as the one depicted at 152, and mixes the secondary oxidant with the pulverized coal and primary oxidant, introduced by burner 152, in a manner that establishes a stable flame in combustion space 104. The pulverized coal is burned in combustion space 104, and the resulting hot flue gas flows through convection pass 106 containing heat exchange surfaces, not shown. The hot flue gas leaving convection pass 106 is conveyed through ductwork 108 to flue gas sector 138 of preheater 110 where it gives up heat to the primary and secondary oxidants flowing through oxidant sectors 140, 142 and 144 of preheater 110. The cooled flue gas leaving preheater 110 is conveyed to an air quality control system via ductwork 112 with about 70 percent to 80 percent of the flue gas being recycled back to boiler 102 as oxidant.

Referring to FIG. 4, there is shown an alternative arrangement wherein ductwork 146 of FIG. 3 is replaced by ductwork 260a and 260b with secondary oxygen mixer 130 of FIG. 3 is now operatively located between ductwork 260a and 260b and referred to in this embodiment as secondary oxygen mixer 230. Secondary oxygen mixer 230 is further located downstream oxidant flow-wise of tri-sector preheater 110. The oxidant exiting sector 140 is, in this embodiment, conveyed through ductwork section 260a to secondary oxygen mixer 230, wherein the secondary oxidant is further enriched with an oxygen stream 232. The further enriched oxidant exiting mixer 230 is conveyed through ductwork section 260b to windbox 148. Additionally, as illustrated in FIG. 4, this embodiment eliminates secondary oxygen mixer 130 located upstream of tri-sector preheater 110 and thus the secondary oxidant exiting forced draft fan 128 is provided via ductwork 234 directly to sector 140.

It should be noted that with regard to the various specific embodiments of tri-sector preheaters disclosed in FIGS. 5 through 8, the reference numerals utilized therein refer to the similar, or in some cases even identical features, if the last two digits of a reference numeral is the same across different Figures. For example, with regard to flue gas sector 138 from FIGS. 3 and 4, the corresponding feature in FIGS. 5 through 8 is denoted by reference numerals 538, 638, 738 and 838 in FIGS. 5 through 8, respectively. This line of reasoning also applies to various other features and/or components of the various different embodiments of the tri-sector preheaters disclosed in all of FIGS. 5 through 8.

Figure 5:
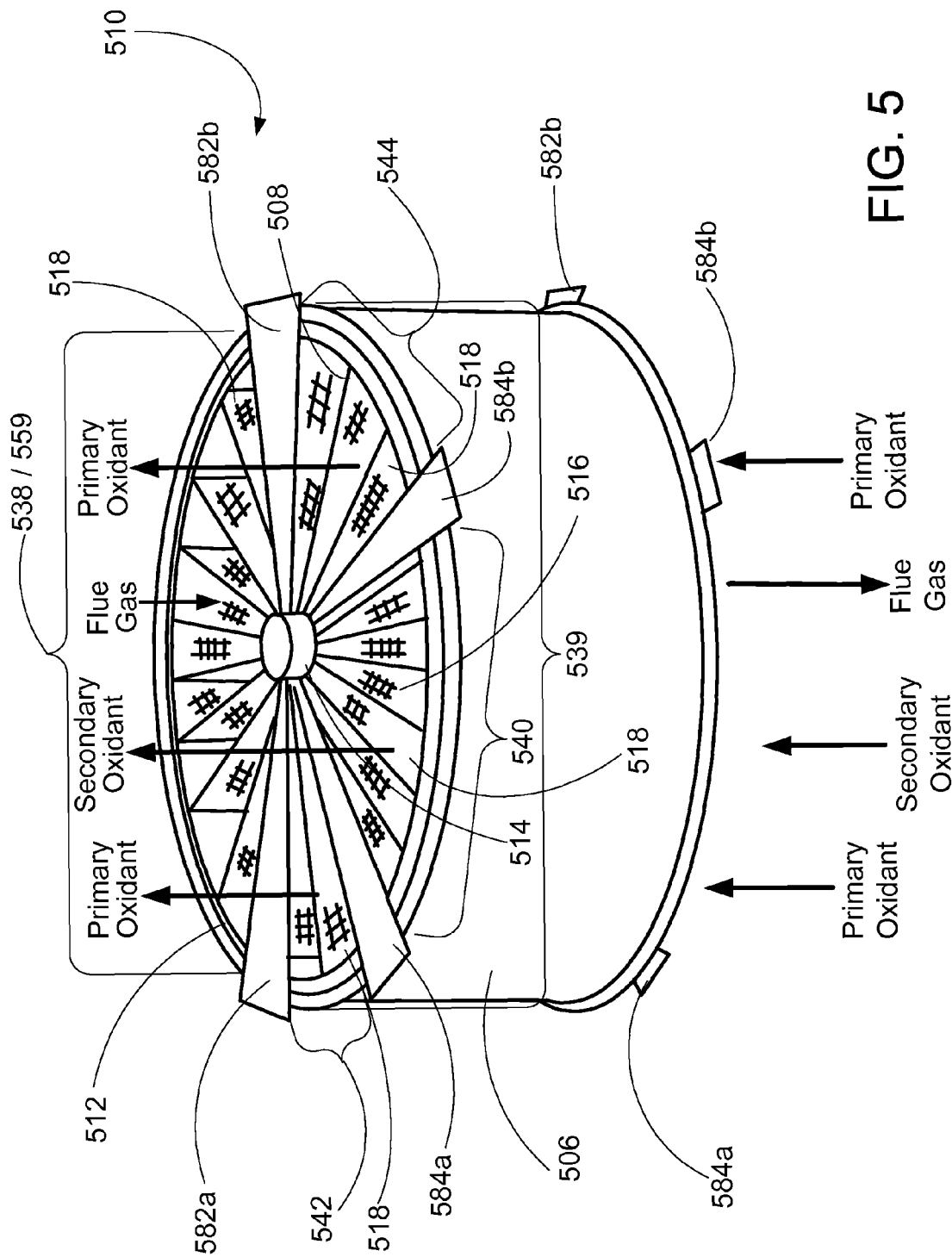
FIG. 5 is a diagrammatic perspective view of the rotor and the sectors of the regenerative oxidant preheater in accordance with the present invention.

Referring to FIG. 5, there is shown, diagrammatically, a tri-sector regenerative oxidant preheater in accordance with the invention and designated as 510 which is one embodiment that can be utilized as tri-sector preheater 110 in the overall systems of FIGS. 3 and/or 4. Oxidant preheater 510 has a rotor 512 coaxially and rotatably mounted in a shell or housing 506. Rotor 512 is divided by a plurality of partitions 508 extending radially outward from a center post 514 to rotor shell 506, and thus dividing rotor 512 into pie shaped compartments 516 containing heat exchanger elements 518. Oxidant preheater 510, of this embodiment, is divided by sector plates 582a and 582b into a flue gas sector 538 (which can also be referred to as flue gas side 559) and an overall multi-sector oxidant side, or portion, 539. Additionally, given that flue gas sector 538 takes up the whole side of oxidant preheater 510, flue gas sector 538 could also be termed flue gas side which in other embodiments is referred to separately as 1159, 1259, 1359 and 1459. Oxidant side 539 is subdivided into, in this embodiment, into a secondary oxidant sector 540 and two primary oxidant sectors 542 and 544 by sector plates 584a and 584b. Secondary oxidant sector 540 is located between primary oxidant sectors 542 and 544, and primary oxidant sectors 542 and 544 are located on opposite sides of secondary oxidant sector 540 between the opposite edges thereof and flue gas sector 538. Thus, secondary oxidant sector 540 is not adjacent to flue gas sector 538 as it is bound on either side by primary oxidant sectors 542 and 544.

Figure 6:
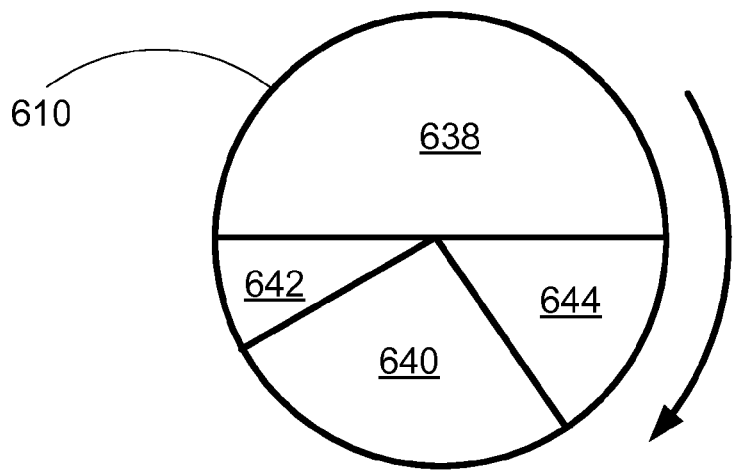
FIG. 6 is a simplified representation of one embodiment of the sectors of the regenerative oxidant preheater in accordance to the present invention.
Figure 7:
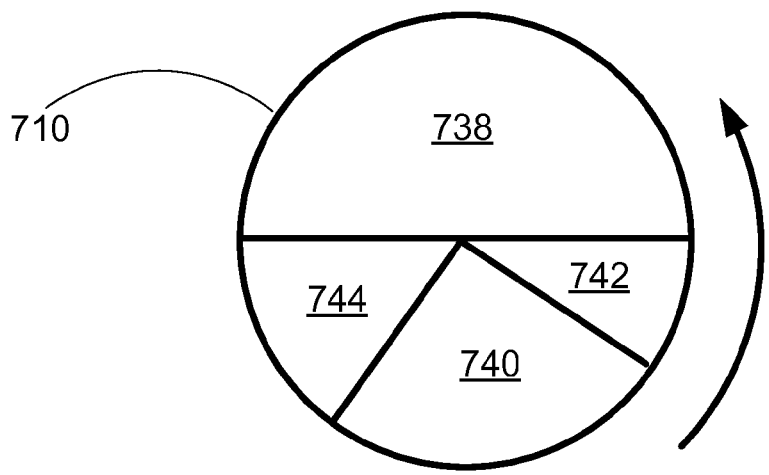
FIG. 7 is a simplified representation of another embodiment of the sectors of the regenerative oxidant preheater in accordance with the present invention.
Figure 8:
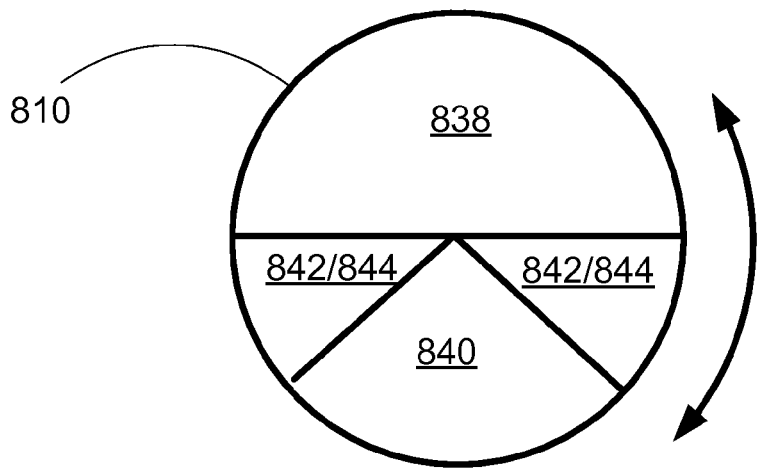
FIG. 8 is a simplified representation of still another embodiment of the sectors of the regenerative oxidant preheater in accordance with the present invention.

Referring to FIGS. 6 through 8, there are shown simplified representations of various embodiments of tri-sector regenerative oxidant preheater 110. Again, it should be noted that any of the tri-sector regenerative oxidant preheater embodiments of FIGS. 6 through 8, that is embodiments 610, 710 and/or 810, can be utilized as device 110 in any of the embodiments disclosed herein. As can be seen from FIG. 6, tri-sector regenerative oxidant preheater 610 has primary oxidant sectors 642 and 644 through which primary oxidant flows and which border flue gas sector 638. As a non-limiting example, in tri-sector regenerative oxidant preheater 610 secondary oxidant flows through sector 640 which is interposed between sectors 642 and 644. In accordance with the present invention, primary oxidant fan 156 is located downstream oxidant flow-wise of preheater 110 (which in connection with this embodiment is device 610) as is shown in FIGS. 3 and 4. The primary oxidant is drawn through sectors 642 and 644 of preheater 610 by primary oxidant fan 156, thus creating an environment in primary oxidant sectors 642 and 644 where the primary oxidant flowing therethrough is at a negative pressure of about 5 inches wg. Secondary oxidant is forced through sector 640 of preheater 610 by forced draft fan 128 which is located upstream gas flow-wise of preheater 110 (which in connection with this embodiment is device 610) as is shown in FIGS. 3 and 4, thus creating an environment in secondary oxidant sector 640 where the secondary oxidant flowing therethrough is at a positive pressure of about 20 inches wg. The flue gas is drawn through sector 638 of preheater 610 by an induced draft fan, not shown, thus creating an environment in flue gas sector 638 where the flue gas is at a negative pressure of about 5 inches wg. As a result of the arrangement of sectors 638, 642 and 644, the pressure difference between flue gas sector 638 and primary oxidant sectors 642 and 644 is insignificant and thus nearly eliminates leakage from the oxidant side to the gas side of preheater 110/610. The pressure difference between secondary oxidant sector 640 and primary oxidant sectors 642 and 644 is about 25 inches wg, but any leakage from sector 640 and sectors 642 and 644 would be secondary oxidant leakage from sector 640 to primary oxidant sectors 642 and 644 (or from sector 140 to sectors 142 and 144 if one where to refer to the reference numerals utilized in FIGS. 3 and 4). As such, there would not be a loss of oxygen to the gas side of preheater 110/610 from secondary oxidant sector 640.

Referring again to FIG. 6, there is shown a simplified representation of a tri-sector regenerative oxidant preheater 610 whose rotation is clockwise. Primary oxidant sector 644 borders the three o'clock side of flue gas sector 638 and is sized to deliver the required primary oxidant temperature. The other primary oxidant sector 642 borders the nine o'clock side of flue gas sector 638 and is sized for the minimum required to substantially preclude the leakage of oxidant into flue gas sector 638 since there is little heat left as primary oxidant passes through sector 642 of preheater 610 as it passes over one or more heat exchanger elements and contacts the rotor of preheater 610 (shown in FIG. 5 as heater exchanger elements 518 and rotor 512). Secondary oxidant sector 640 is interposed between primary oxidant sectors 642 and 644, and is sized to deliver the required secondary oxidant temperature. It should be noted that as is shown in FIG. 5 other sectors of the various embodiments of tri-sector oxidant preheaters of the present invention can also have therein one or more heat exchanger elements.

Referring to FIG. 7, there is shown a simplified representation of a tri-sector regenerative oxidant preheater 710 whose rotation is counterclockwise. In this embodiment, primary oxidant sector 744 borders the nine o'clock side of the flue gas sector 738, and is sized to deliver the required primary oxidant temperature. The other primary oxidant sector 742 borders the three o'clock side of the flue gas sector 738, and is sized for the minimum required to substantially preclude the leakage of oxidant into flue gas sector 738 since there is little heat left as primary oxidant passes through sector 742 of preheater 710 as it passes over one or more heat exchanger elements and contacts the rotor of preheater 710 (shown in FIG. 5 as heater exchanger elements 518 and rotor 512). Secondary oxidant sector 740 is interposed between primary oxidant sectors 742 and 744, and is sized to deliver the required secondary oxidant temperature.

Referring to FIG. 8, there is shown a simplified representation of a tri-sector regenerative oxidant preheater 810 whose rotation can be either clockwise or counterclockwise. Primary oxidant sectors 842 and 844, bordering the three o'clock and nine o'clock sides of flue gas sector 838 are of substantially equal size and, when taken together, are sized to deliver the required primary air temperature. Secondary oxidant sector 840 is interposed between primary oxidant sectors 842 and 844, and is sized to deliver the required secondary oxidant temperature. It should be noted that some of the reference numerals and related lead lines from FIG. 5 have intentionally left out of FIGS. 6 through 8 for simplicity.

Figure 9:
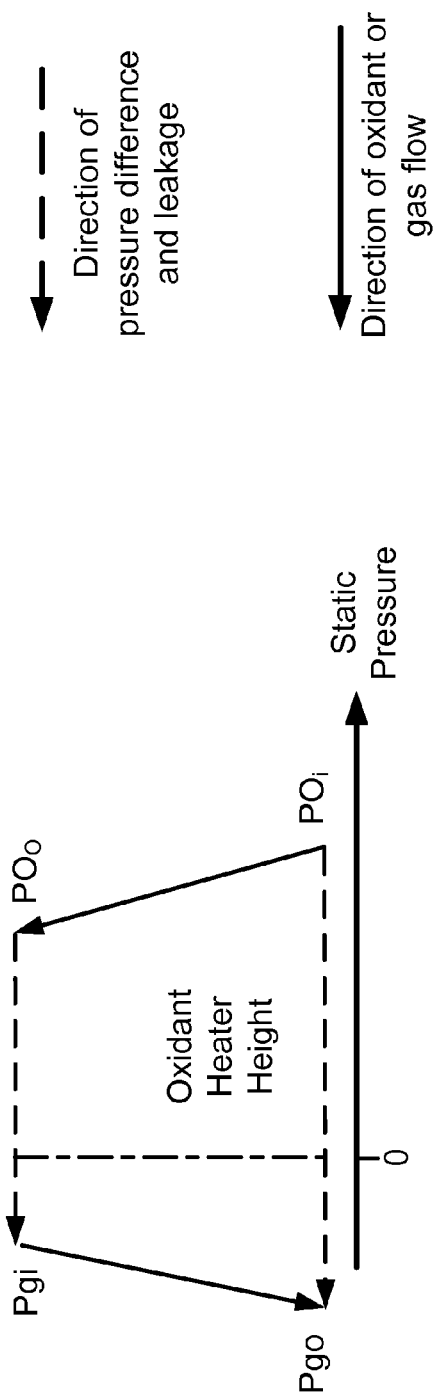
FIG. 9 is a graphical presentation of the pressure profiles through a conventional regenerative oxidant preheater.

Referring to FIG. 9, there is shown a graphical presentation of the oxidant and flue gas pressure profiles of a conventional oxidant preheater. The pressure of the oxidant entering the preheater POi is positive and is much higher than the negative pressure flue gas leaving the preheater Pgo. The pressure of the oxidant leaving the preheater POo is positive, and remains much higher than the negative pressure flue gas entering leaving the preheater Pgi. The large pressure difference between the positive pressure oxidant and the negative pressure flue gas, passing through the preheater, causes leakage of oxidant into the gas side of the preheater.

Figure 10:
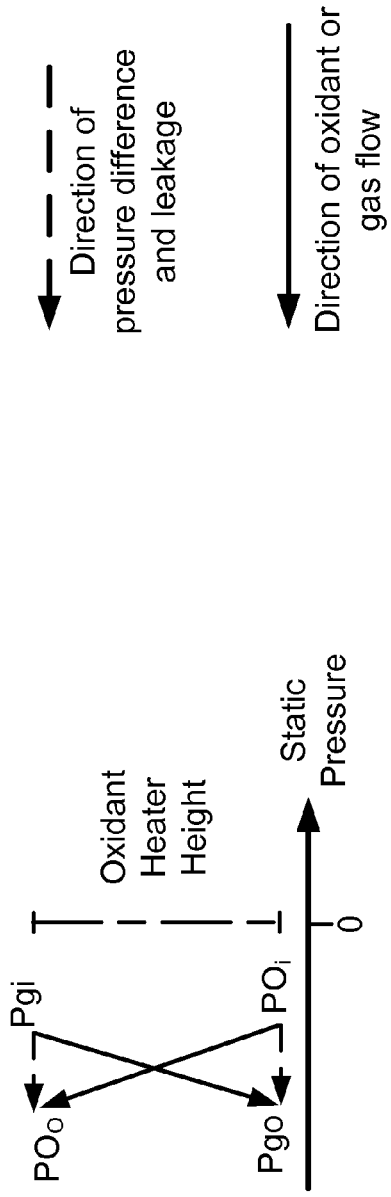
FIG. 10 is a graphical presentation of the pressure profiles through a tri-sector regenerative oxidant preheater in accordance with the present invention.

Referring to FIG. 10, there is shown a graphical presentation of the oxidant and flue pressure profiles of the present invention. The pressure of the oxidant entering the preheater POi is somewhat less negative than the negative pressure flue gas leaving the preheater Pgo. The pressure of the oxidant leaving the preheater POo is somewhat more negative than the negative pressure flue gas entering the preheater Pgi. The somewhat lesser negative pressure of the oxidant entering the preheater POi results in a slight leakage of oxidant into the gas side of the preheater. The somewhat lesser negative pressure of the flue gas entering the preheater Pgi results in a slight leakage of flue gas into the oxidant side of the preheater.

It should be noted that with regard to the various specific embodiments of tri-sector preheaters disclosed in FIGS. 11 through 14, the reference numerals utilized therein refer to the similar, or in some cases even identical features, if the last two digits of a reference numeral is the same across different Figures. For example, with regard to flue gas sector 138 from FIGS. 3 and 4, the corresponding feature in FIGS. 11 through 14 is denoted by reference numerals 1138, 1238, 1338 and 1438 in FIGS. 11 through 14, respectively. This line of reasoning also applies to various other features and/or components of the various different embodiments of the tri-sector preheaters disclosed in all of FIGS. 11 through 14 as well as the systems of FIGS. 15 through 17.

Figure 11:
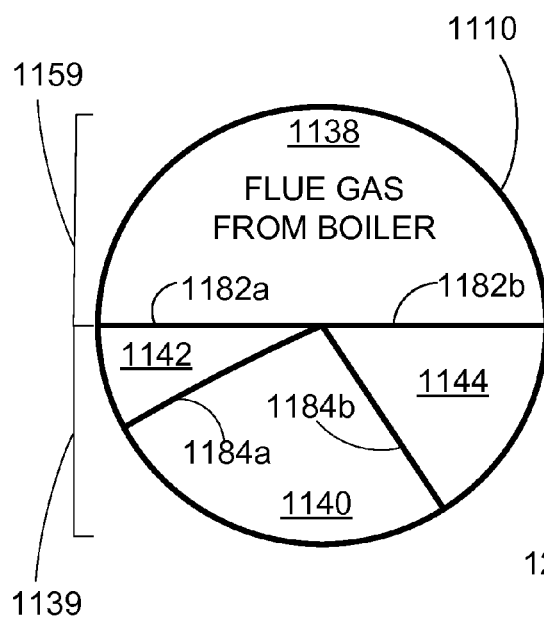
FIG. 11 is a cross sectional view showing a regenerative oxidant preheater internal sector arrangement according to the present invention.

FIG. 11 shows a cross sectional view of a regenerative oxidant preheater 1110 having an internal sector arrangement according to another embodiment of the present invention. It consists of a flue gas side 1159 and a combustion oxidant side 1139 which are separated by sector plates 1182a and 1182b. Flue gas side 1159 consists of a single flue gas sector 1138 through which a flue gas stream 1508 (shown in FIGS. 15 and 16) flows away from a boiler 1502 as it leaves the boiler's gas exit 1576 (shown in FIGS. 15 and 16). Combustion oxidant side 1139 comprises two primary combustion oxidant sectors 1142 and 1144 and one secondary combustion oxidant sector 1140, each of which is separated from the others by sector plates 1184a and 1184b. Primary sectors 1142 and 1144 contain primary combustion oxidant streams delivered by ductwork 1536 which, although shown as a single portion of ductwork in FIGS. 15 and 16, can be split into two portions of ductwork to deliver primary oxidant streams individually to sectors 1142 and 1144 (see FIGS. 3 and 4 and the text related thereto for a discussion of such a split embodiment). Secondary oxidant sector 1140 contains a secondary combustion oxidant stream delivered by ductwork 1534 (shown in FIGS. 15 and 16 and hereinafter referred to as secondary oxidant stream 1534). With regard to other ductwork shown in connection with various embodiments of the present invention, when referring to the stream provided by such ductwork the reference numeral used in connection with the ductwork will also be used to identify the stream contained therein. The primary combustion oxidant streams and the secondary combustion oxidant stream flow through various sectors 1140, 1142 and 1144 in a counterflow manner to flue gas stream 1508 delivered to flue gas sector 1138 on their way toward the boiler.

As further illustrated in FIG. 11, each of the two primary sectors 1142 and 1144 are adjacent to (i.e., they abut) flue gas sector 1138 of oxidant preheater 1110. Additionally, secondary combustion oxidant sector 1140 is positioned between two primary sectors 1142 and 1144.

In order for the present invention to accomplish its objectives, it is essential that there be at least two primary combustion oxidant sectors 1142 and 1144 each positioned adjacent to flue gas sector 1138 of oxidant preheater 1110. However, as illustrated by another embodiment of the oxidant preheater internal sector arrangement shown in FIG. 14 there can be more than two primary combustion oxidant sectors 1442, 1444 and 1464.

Figure 13:
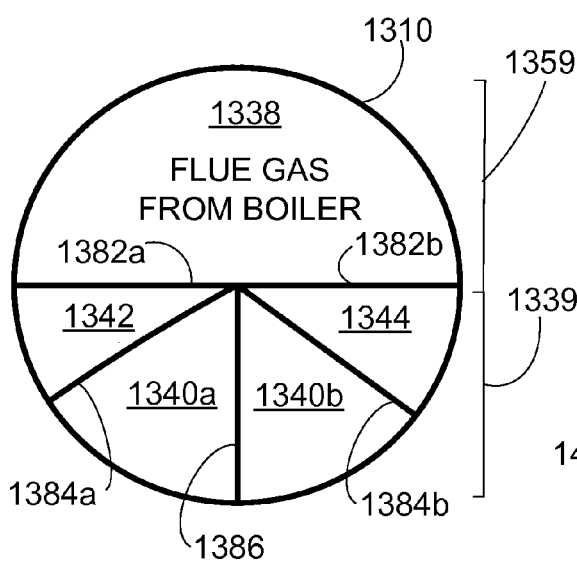
FIG. 13 is a cross sectional view showing another embodiment of a regenerative oxidant preheater internal sector arrangement according to the present invention.
Figure 14:
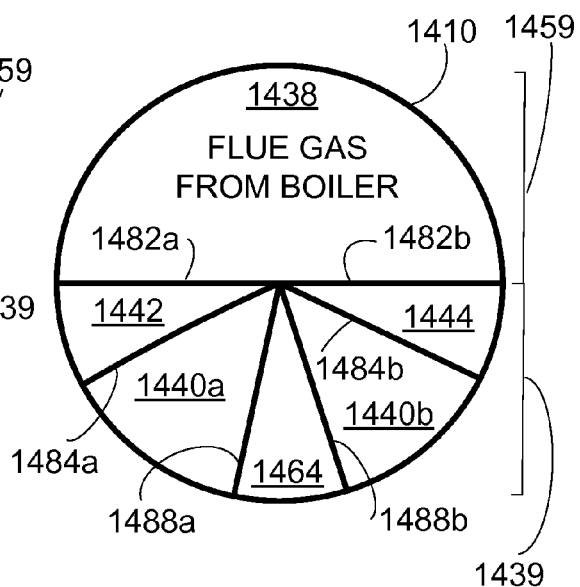
FIG. 14 is a cross sectional view showing yet another embodiment of a regenerative oxidant preheater internal sector arrangement according to the present invention.

Similarly, there can be more than one secondary combustion oxidant sector as shown in both FIG. 13 with secondary combustion oxidant sectors 1340a and 1340b which are formed by splitting a single secondary combustion oxidant sector 1140 with a sector plate 1386 to form two secondary combustion oxidant sectors 1340a and 1340b, and in FIG. 14 with secondary combustion oxidant sectors 1440a and 1440b (which illustrates an additional embodiment of the oxidant preheater internal sector arrangement). However, although there may be more than one, it is essential that all secondary sectors 1340a/1440a and 1340b/1440b be positioned between two primary combustion oxidant sectors 1342/1442 and 1344/1444 which abut flue gas sector 1338/1448, and that none of the secondary combustion oxidant sectors 1340a/1440a and 1340b/1440b be positioned adjacent to flue gas sector 1338/1438 of oxidant preheaters 1310/1410, respectively.

In order to describe the benefits afforded by the present invention and how it functions, a discussion of the oxygen concentrations and static gas pressures of primary oxidant stream 1536, secondary oxidant stream 1534 and flue gas stream 1508 is required.

Figure 12:
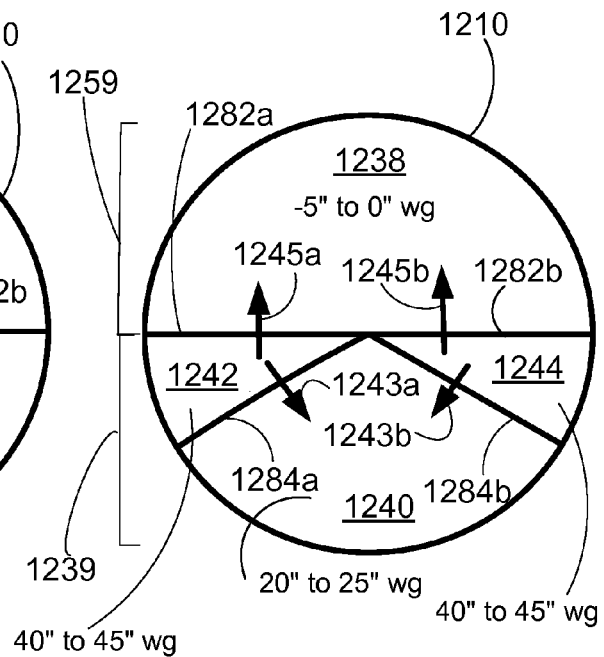
FIG. 12 is a cross sectional view of a regenerative oxidant preheater internal sector arrangement according to the present invention which shows the typical static gas pressure of the respective oxidant and flue gas streams as well as the direction of leakage.

As illustrated in FIG. 12, in a regenerative oxidant preheater for an oxy-combustion power plant, a typical static gas pressure for primary combustion oxidant sectors 1242 and 1244 is from about +40 to +45 inches of wg, for secondary combustion oxidant sector 1240 it is from about +20 to +25 inches wg, and for flue gas sector 1238 from boiler 102 (or 1502) it is from about −5 to 0 inches wg. Although the static gas pressure values shown in FIG. 12 are representative of a coal fired oxy-combustion plant they may vary depending on fuel and equipment variations and should not be considered absolute. Additionally, in some embodiments the static gas pressure value in one primary combustion oxidant sector (e.g., sector 1242) may be different from and/or vary independently from the static gas pressure value in the other primary combustion oxidant sector (e.g., sector 1244).

Since it is the pressure differential between the respective sectors which drives leakage and since typically the greater the degree of leakage the more oxygen is lost, it is not intuitively obvious that the best internal configuration would locate the higher pressure primary combustion oxidant stream 1536 adjacent to flue gas stream 1508 from boiler 1502 to avoid loss of oxygen, since the leakage would be considerably higher than with a conventional internal arrangement. However, when taking into consideration the typical oxygen concentrations of the respective streams the reason for doing so becomes clear.

In an oxy-fuel combustion system, secondary oxidant stream 1534 typically has an oxygen concentration of about 20.0 percent which is generally greater than that of both primary oxidant stream 1536 and flue gas stream 1508. A typical oxygen concentration for primary oxidant stream 1536 before additional oxygen is added is around 2.5 percent and flue gas stream 1508 usually has an oxygen concentration of about 2.5 percent.

Figure 15:
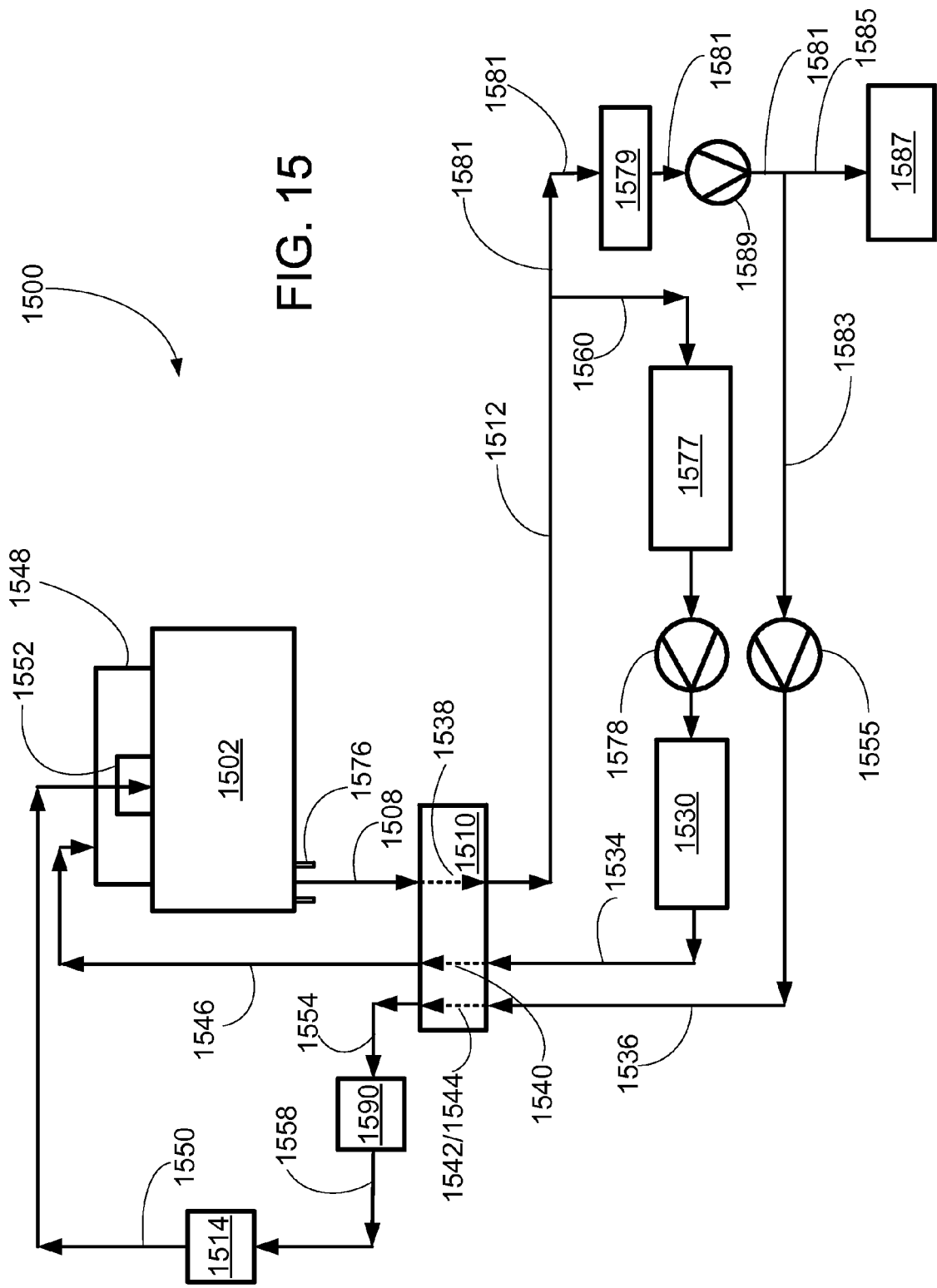
FIG. 15 is a schematic illustration of a system configuration for warm recycle oxy-fuel combustion according to the present invention showing, among other aspects, the respective positions of the oxidant heater, primary oxidant fan and primary oxidant mixer.

FIG. 15 is a schematic view of a warm recycle system 1500 embodiment according to the present invention employing an oxidant preheater 1510 with one of the above described novel internal sector arrangements. Additionally, the inventive system 1500 incorporates, among other elements, a primary oxidant fan 1555, for feeding primary oxidant flow to oxidant preheater 1510 (which in this embodiment is device 1110 but can alternatively be selected from any of the specific preheater devices 510, 610, 710, 810, 1210, 1310 or 1410 discussed herein) located before (or upstream from) oxidant preheater 1510. It also comprises a primary oxidant mixer 1590 for injecting oxidant into primary oxidant stream contained in ductwork 1554, located after (or downstream from) oxidant preheater 1510. The oxidant which is added to the primary oxidant stream by primary oxidant mixer 1590 is, in one non-limiting instance, pure or nearly pure oxygen. However, other oxidants such as for example atmospheric air or a mixture of flue gas and oxygen can also be used.

As can be seen in FIG. 12, the static gas pressure differential between primary and secondary oxidant streams flowing through primary combustion oxidant sectors 1242 and 1244 (emerging as a flow contained in ductwork 1558 after primary oxidant mixer 1590) and secondary combustion oxidant sector 1240 (emerging as a flow contained in ductwork 1546) is about +25 inches wg. Therefore, the internal oxidant preheater leakage will be from the two or more un-oxygenated primary streams 1536 into oxygenated secondary stream 1534, as indicated by arrows 1243*a* and 1243*b*. Also, the pressure difference between primary stream 1536 and flue gas stream 1508 which respectively flow through primary sectors 1242 and 1244 and flue gas sector 1238 of oxidant preheater 1210 is high (i.e., between +45 to +50 inches wg) which results in relatively high amount of leakage from the two or more un-oxygenated primary streams 1536 to un-oxygenated flue gas stream 1508 as indicated by arrows 1245*a* and 1245*b*. Thus, because primary stream 1536 has a very low oxygen content, roughly equal to that of flue gas stream 1508, and because essentially all leakage will be from primary stream 1536 to both flue gas stream 1508 and secondary combustion oxidant stream 1534, essentially no oxygen is lost from stream 1534 as this stream passes through oxidant preheater 1510 and emerges as stream 1546 on the downstream of oxidant 1510.

Accordingly, use of the inventive oxidant preheater internal arrangement in a system which places, for example, primary oxidant mixer 1590 downstream, ensures that no costly oxygen is lost because leakage to flue gas side 1159 (or flue gas sector 1138) and into flue gas stream 1508 will only be from the high pressure and low oxidant concentration primary stream 1536 as this stream passes through oxidant preheater 1510 and emerges as stream 1554.

Thus, one method of the present invention includes the steps of providing an oxidant preheater 1510 with the above described internal sector arrangement; providing a primary oxidant fan 1555 upstream from oxidant preheater 1510 for feeding primary oxidant stream 1536 flow to oxidant preheater 1510 (which in this embodiment is device 1110 but can alternatively be selected from any of the specific preheater devices 510, 610, 710, 810, 1210, 1310 or 1410 discussed herein); splitting the cold primary combustion oxidant stream 1536 before it enters oxidant preheater 1510 on its way to boiler 1502; and directing the split primary combustion oxidant stream 1536 to flow through the at least two separate primary combustion oxidant sectors 1540 and 1542.

A method of the present invention also includes the steps of allowing cold primary oxidant from primary combustion oxidant stream 1536 flowing through the at least two primary combustion oxidant sectors 1142 and 1144 to leak into both flue gas sector 1138 (or side 1159) and into secondary combustion oxidant sector 1140; and then introducing oxidant into primary combustion oxidant stream 1536 downstream from oxidant preheater 1510 (which in this embodiment is device 1110 but can alternatively be selected from any of the specific preheater devices 510, 610, 710, 810, 1210, 1310 or 1410 discussed herein) via ductwork 1554/1558 using, for example, primary oxidant mixer 1590 as discussed above.

Furthermore, since the flow of primary combustion oxidant stream 1536 is less than the flow of secondary combustion oxidant stream 1534 and because the amount of oxygen in primary stream 1536 is much less, injecting the cooler oxygen into primary stream 1536 downstream from oxidant preheater 1510 (which in this embodiment is device 1110 but can alternatively be selected from any of the specific preheater devices 510, 610, 710, 810, 1210, 1310 or 1410 discussed herein) has the least impact on oxidant preheater 1510 balance (loss of cooling and flow to absorb heat) and, if the oxygen is preheated before mixing with primary oxygen stream 1536 it reduces its impact on achieving the required primary oxygen temperature at the pulverizer for coal drying.

Accordingly, the method of the present invention may include the step of preheating the oxidant before it is introduced into primary combustion oxidant stream 1536 via ductwork 1554/1558 using, for example, primary oxidant mixer 1590 as discussed above.

Primary oxidant fan 1555 provides volumetric flow to primary oxidant stream 1536 so that it flows through oxidant preheater 1510. Therefore, due to the large amount of internal leakage from primary combustion oxidant stream 1536 to flue gas stream 1508, the flow of primary oxidant flowing out of oxidant preheater 1510 toward boiler 1502 is reduced. Thus, the output of primary fan 1555 must be increased to maintain primary flow to the one or more pulverizers 1514 so as to compensate for the flow lost to internal leakage.

Accordingly, a method in accordance with one embodiment of the present invention also includes the step of increasing the power to primary oxidant fan 1555 to provide an additional primary flow to oxidant preheater 1510.

Referring now to the various features of system 1500 of the present invention as is illustrated in FIG. 15, flue gas stream 1508 which exits boiler 1502 via boiler gas exit 1576 flows through flue gas side 1159 (or flue gas sector 1138) of oxidant preheater 1510 (which in this embodiment is device 1110 but can alternatively be selected from any of the specific preheater devices 510, 610, 710, 810, 1210, 1310 or 1410 discussed herein). After passing through oxidant preheater 1510, a portion 1512 of flue gas stream 1508 which exits oxidant preheater 1510 splits to form secondary oxidant stream 1560 as well as an intermediate flue gas stream 1581.

Specifically with regard to system 1500, downstream from the point at which portion 1512 of flue gas stream 1508 splits into secondary oxidant stream 1560 is provided a particulate removal unit 1577 for removing particulate matter, such as ash, from secondary combustion oxidant stream 1560. Just downstream from particulate removal unit 1577, system 1500 of the present invention comprises a secondary oxidant fan 1578 for feeding secondary flow to oxidant preheater 1510 which is positioned upstream from oxidant preheater 1510.

Additionally, downstream of secondary oxidant fan 1578 and upstream from oxidant preheater 1510 is provided a secondary oxidant mixer 1530 for introducing oxidant into secondary combustion oxidant stream 1534. Just as with primary oxidant mixer 1510, the oxidant which is added to secondary oxidant stream 1534 by secondary oxidant mixer 1530 is, in one non-limiting instance, pure or nearly pure oxygen. However, other oxidants such as atmospheric air or a mixture of flue gas and oxygen can also be used. In an alternative embodiment secondary oxidant mixer 1530 is placed upstream of secondary oxidant fan 1578.

In addition, system 1500 of the present invention also comprises a gas quality control system (GQCS) unit 1579 located along intermediate flue gas stream 1581. GQCS unit 1579 may comprise one or more particulate, sulfur and/or moisture removal devices to treat the passing flue gas stream 1581. After it passes through GQCS unit 1579, intermediate flue gas stream 1581 splits to form primary combustion oxidant stream 1583 as well as a compression and purification (CPU) stream 1585 which leads to a compression and purification unit 1587.

Finally, after passing through oxidant preheater 1510, primary combustion oxidant stream 1558 flows to one or more coal pulverizers 1514, where it dries the coal and conveys the coal via a conduit 1550 to one or more burners 1552, subsequently entering the combustion process. Additionally, after secondary combustion oxidant stream 1534 passes through oxidant preheater 1510, it flows to a windbox 1548 attached to boiler 1502 via ductwork 1546, before entering the one or more burners 1552 and exiting into the combustion process.

Accordingly, a method of the present invention may comprise the additional steps of providing a secondary oxidant fan 1578 for feeding secondary oxidant stream 1560 flow to oxidant preheater 1510 and positioning it upstream from oxidant preheater 1510; providing a secondary oxidant mixer 1530 at a location upstream from oxidant preheater 1510 and downstream from secondary oxidant fan 1578 for the purpose of introducing oxidant into secondary combustion oxidant stream 1534.

Furthermore, the method of the present invention may include the further steps of splitting a portion 1512 of flue gas stream 1508 which exits oxidant preheater 1510 to form secondary combustion oxidant stream 1560 and an intermediate flue gas stream 1581; providing a particulate removal unit 1577 along secondary combustion oxidant stream 1534 at a position upstream of secondary oxidant fan 1578; providing an GQCS unit 1579 on intermediate flue gas stream 1581; splitting intermediate flue gas stream 1581 after it passes through GQCS unit 1579 to form both primary combustion oxidant stream 1583 and CPU stream 1585 which leads to a compression and purification (CPU) unit 1587.

Finally, the method of the present invention may also comprise the further steps of directing secondary combustion oxidant stream 1534 to windbox 1548, after it passes through oxidant preheater 1510 and directing primary combustion oxidant stream 1558 to a coal pulverizer 1514 after it passes through oxidant preheater 1510 and oxygen mixer 1590.

Use of the above described system 1500 and methods of the present invention provide several advantages over conventional systems for warm recycle oxy-fuel combustion.

The system and method of the present invention not only prevents loss of oxygen from the process as described above, it also provides sufficient cool primary combustion oxidant from primary combustion oxidant stream 1536 to oxidant preheater 1510 which along with oxygenated secondary oxygen stream 1534 allows an acceptable oxidant preheater 1510 exit gas temperature.

Additionally the present invention also may reduce total fan power required when compared to other conventional systems. Referring to FIG. 15, primary combustion oxidant stream 1536 flowing to oxidant preheater 1510 is adjusted by primary fan 1555 to achieve the desired primary outlet flow to coal pulverizer 1514. As mentioned above, the primary inlet flow to oxidant preheater 1510 will be higher than the outlet flow as a result of internal leakage. The need to compensate for the volume of flow lost to leakage will require an increase in power to primary fan 1555 to provide additional flow. In addition, the flow though induced draught (ID) fan 1589 will be increased by the leakage within oxidant preheater 1510. Although, ID fan 1589 is shown downstream of GQCS unit 1579, the present invention is not limited to this sole arrangement. Rather, depending upon the nature of the one or more devices contained in GQCS unit 1579, ID fan 1589 could be upstream or downstream of GQCS unit 1579. For example, if GQCS unit 1579 is a wet scrubber (see, e.g., GQCS unit 1779 in FIG. 17) then ID fan 1589 can be located upstream of GQCS unit 1579 (see, e.g., ID fan 1789 of FIG. 17). In still another embodiment, should one or more devices be present as GQCS unit 1579 then one or more ID fans 1589 could be located upstream, downstream, or even between various device portions of GQCS unit 1579.

However, since secondary stream 1534 will gain flow from primary stream 1536 due to leakage, secondary combustion oxidant flow 1534 into oxidant preheater 1510 is reduced compared to the required outlet flow. This results in a reduced power requirement for secondary oxidant (or forced draft) fan 1578. Since secondary fan 1578 typically operates at about 300° F. or higher, or even at about 350° F. or higher (warm recycle embodiments) while primary fan 1555 and ID fan 1589 typically operates at about 170° F. or lower, or even at about 150° F. or lower, primary stream 1536 and intermediate stream 1581 is much cooler than secondary stream 1534/1560 hence the power increase for ID fan 1589 and primary fan 1555 can be less than the power reduction in warm secondary fan 1578 resulting in a net power savings depending on the magnitude of internal leakages (see FIGS. 15 through 19).

In warm recycle embodiments, some of the higher primary flow will also leak to the exit gas side which will result in an increased flow to the scrubbers and moisture removal equipment resulting in a reduction in total sulfur and moisture returned to boiler 1502 via a primary recycle stream (not shown). The final flow to CPU unit 1587 will be unchanged in magnitude and composition.

Furthermore, use of the system and method of the present invention also reduces sulfur and moisture in boiler 1502. As a result of the substantial internal oxidant preheater 1510 leakage(s), the flow in intermediate flue gas stream 1581 which splits to form primary stream 1583 and CPU stream 1585 is increased. In the warm recycle process, secondary combustion oxidant stream 1560 passes through particulate removal unit 1577, secondary fan 1578, and is then routed directly back to oxidant preheater 1510 as stream 1534 and then from oxidant preheater 1510 to windbox 1548 attached to boiler 1502 with no sulfur or moisture removal as stream 1546. However, intermediate flue gas stream 1581 passes through one or more particulate, sulfur and moisture removal devices in GQCS unit 1579. As a result, more flow passes through GQCS unit 1579 than would otherwise.

Since the primary flow in primary oxidant stream 1536 to oxidant preheater 1510 is increased in order to compensate for leakage, and because sulfur and moisture have been removed from that flow, the total amount of sulfur and moisture that returns to boiler 1502 is reduced as is the sulfur and moisture in the gas leaving oxidant preheater 1510 by virtue of the internal leakage from primary steam 1536. In other words, since more gas is treated to remove sulfur and moisture, and since the flow to CPU unit 1587 is unchanged, the total moisture and sulfur in recycled oxidant streams 1536 and 1534 are lower, resulting in lower concentrations in boiler 1502.

Furthermore, if oxidant preheater 1510 is sized so that conversion to full air firing does not change oxidant preheater 1510's shell it still may require routine changes to baffling and baskets (generally for the first application only). Thus, this design of the present invention could be converted to full air firing with a relatively simple and inexpensive internal change if necessary and/or desired.

Because the system and method of the present invention allow the use of a regenerative oxidant preheater it reduces a plant's capital cost because regenerative oxidant heaters are less costly than separate tubular oxidant heaters and require considerably less space. Additionally, because its use substantially reduces the loss of costly oxygen and in many applications reduces the total fan power requirement, the system and method of the present invention enables plant operating cost reductions.

Figure 17:
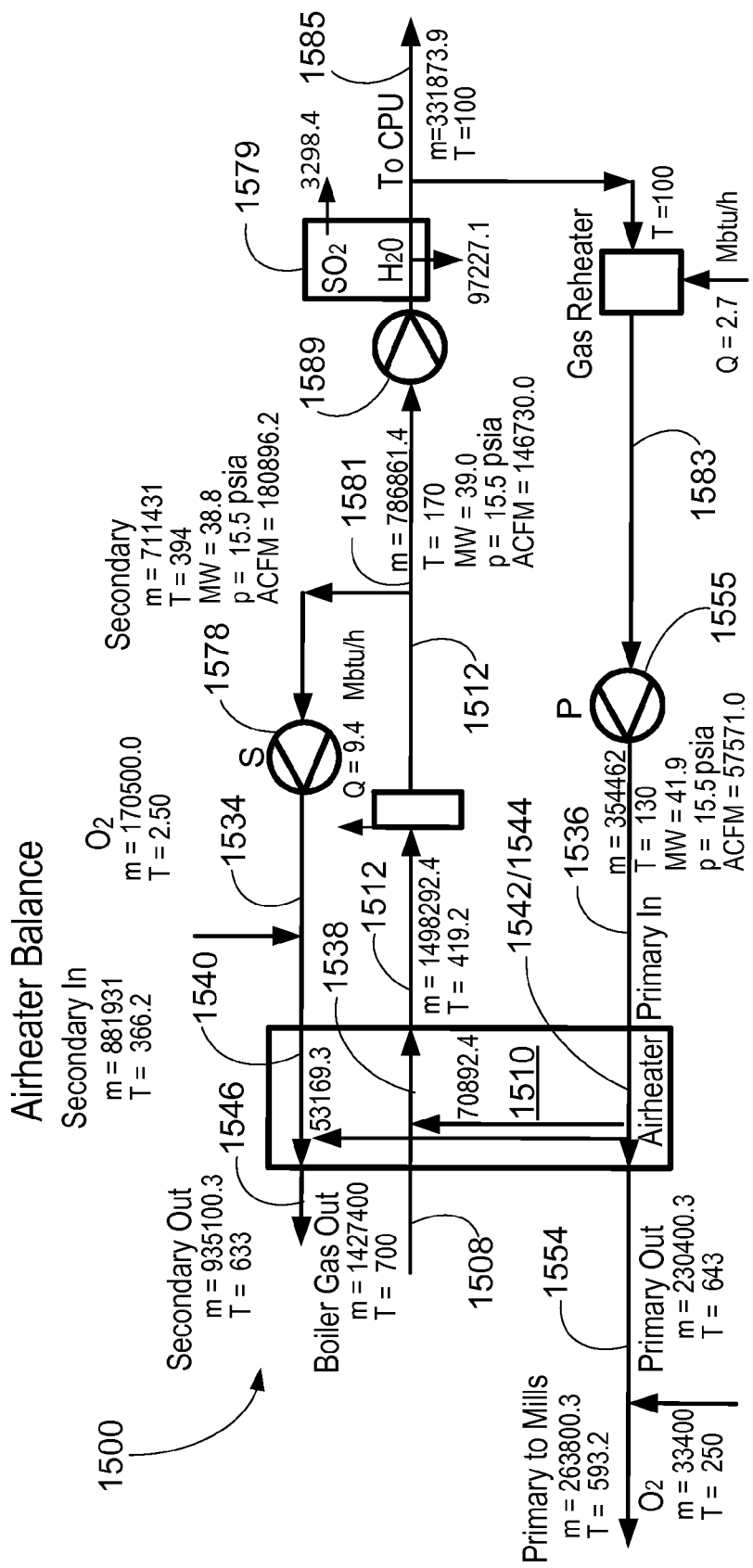
FIG. 17 is a schematic view of a system configuration for warm-recycle oxy-fuel combustion according to the present invention.
Figure 18:
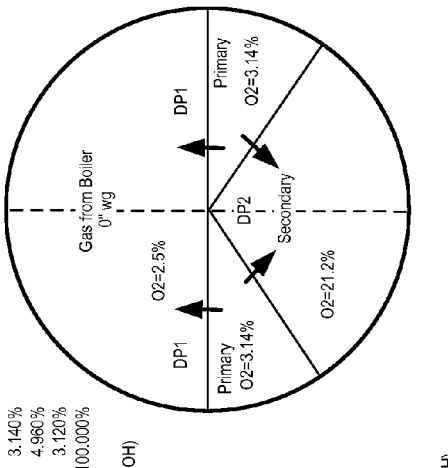
FIG. 18 is a table diagram of data relating to an embodiment of the present invention.

FIGS. 18 and 19 contain tables showing approximate estimates for oxygen and fan power used when employing the present invention as compared with separate primary and secondary oxidant heaters. Additionally, FIG. 17 shows oxidant preheater balance in a system for warm recycle oxy-fuel combustion which employs the present invention as compared with what it would be if separate primary and secondary oxidant heaters were used.

The calculations in FIGS. 18 and 19, as well as those in FIG. 12, are based on the assumption that the internal leakage from primary oxidant stream 1536 to flue gas stream 1508 and secondary oxidant stream 1534 is 20.0 percent and 15.0 percent respectively. The assumed leakage is what would be expected when the pressure of primary oxidant stream 1536 is +45 inches wg, when the pressure of secondary oxidant stream 1534 is +25 inches wg and when the pressure of flue gas stream 1508 is zero inches wg.

As illustrated in FIGS. 18 and 19, as well as those in FIG. 12, use of the present invention leads to the following advantages over separate primary and secondary oxidant heaters. In one aspect, the present invention allows use of a single regenerative oxidant heater. Also, the amount of costly oxygen saved would be about 1.19 metric tons per hour. Additionally, when using the present invention, there is a reduction in total fan power required of about 50.2 kilowatts of energy. Furthermore, the total sulfur and moisture contents in the primary and secondary recycle streams to the boiler were noticeably lower. As a result, use of the present invention significantly reduces plant capital cost as well as plant operating cost as compared with use of a conventional system.

Figure 16:
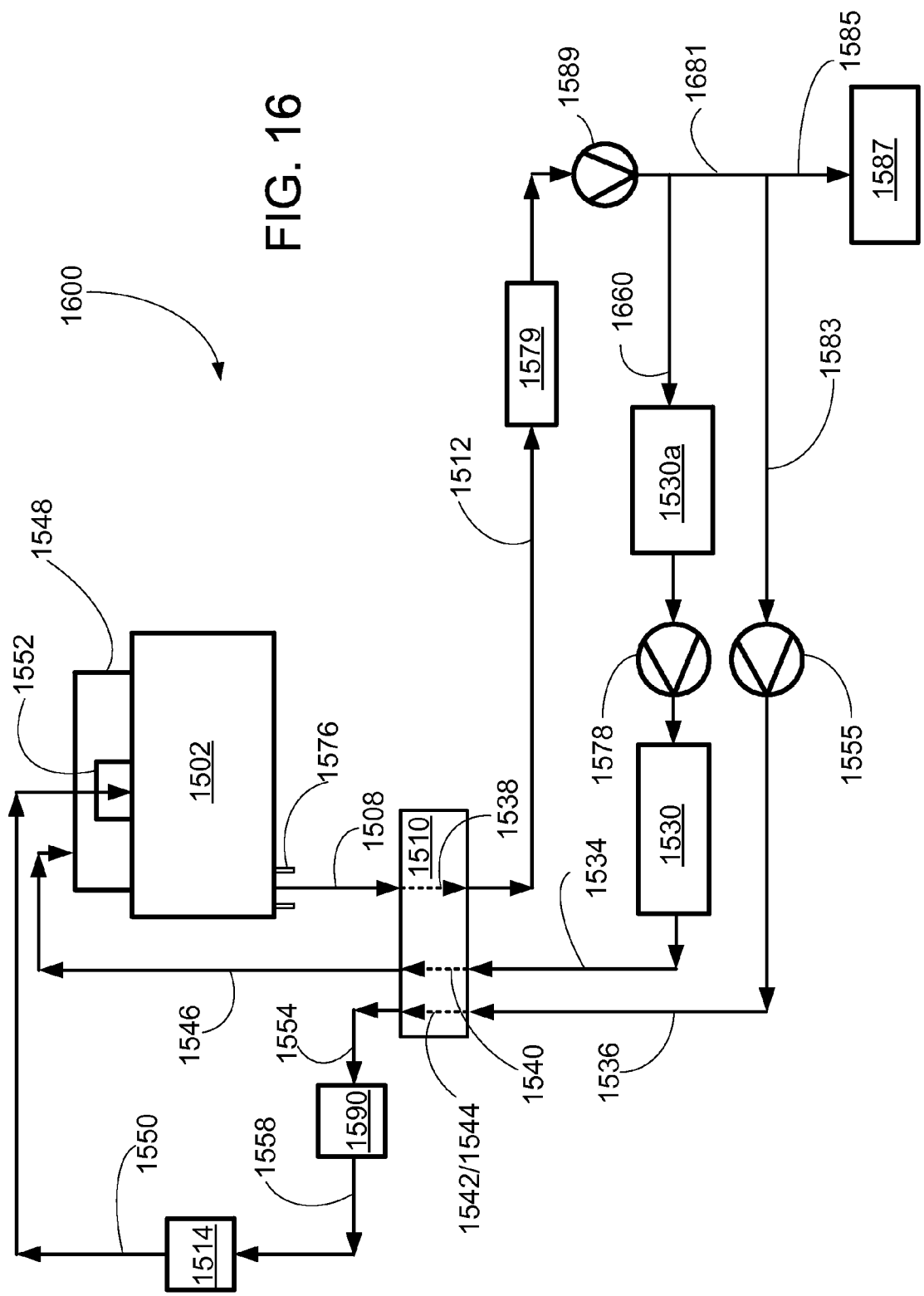
FIG. 16 is a schematic illustration of a system configuration for cold recycle oxy-fuel combustion according to the present invention showing, among other aspects, the respective positions of the oxidant heater, primary oxidant fan and primary oxidant mixer.

Referring now to FIG. 16, a schematic illustration of an alternative system configuration embodiment, known as cold recycle is shown. In this embodiment flue gas exit stream 1512 is split after GQCS unit 1579 thereby subjecting all recycled flow to GQCS treatment prior to being split into a primary combustion oxidant stream 1583 and secondary oxidant stream 1660 streams. An alternative, or supplemental, location for secondary oxidant mixer 1530*a* is also shown.

While specific embodiments of the invention have been shown and described in detail to illustrate the application of the principles of the invention, it will be understood that the invention may be embodied otherwise without departing from such principles.

What is claimed is:

1. A tri-sector rotary regenerative oxidant preheater including a stationary housing, a rotor rotatably mounted in the housing, sector plates located at the axial ends of the rotor for dividing the preheater into a flue gas sector, a secondary oxidant sector, and two primary oxidant sectors, the secondary oxidant sector being interposed between the primary oxidant sectors, and wherein during operation of the preheater, the flue gas sector and the primary oxidant sectors have a negative pressure environment, and the secondary oxidant sector has a positive pressure environment.

2. The preheater according to claim 1, wherein there is substantially no pressure differential between the environments of the flue gas sector and the primary oxidant sectors.

3. The preheater according to claim 1, wherein the environments in the flue gas sector and the primary oxidant sectors are at a negative pressure of about 5 inches wg.

4. The preheater according to claim 1, wherein the environment in the secondary oxidant sector is at a positive pressure of about 20 inches wg.

5. The preheater according to claim 1, wherein the primary oxidant sector bordering the three o'clock side of the flue gas sector is larger than the primary oxidant sector bordering the nine o'clock side of the flue gas sector.

6. The preheater according to claim 1, wherein the primary oxidant sector bordering the three o'clock side of the flue gas sector is smaller than the primary oxidant sector bordering the nine o'clock side of the flue gas sector.

7. The preheater according to claim 1, wherein the primary oxidant sectors are of substantially equal size.

8. An oxidant preheater internal sector arrangement comprising:

a flue gas side consisting of a sector, through which a flue gas stream having an air pressure, flows away from a boiler having a gas exit as the flue gas stream leaves the gas exit; and a counterflowing combustion oxidant side, the combustion oxidant side being comprised of:
- at least one secondary combustion oxidant sector through which an oxygenated secondary combustion oxidant stream flows toward the boiler, the secondary combustion oxidant stream having an air pressure; and
- at least two primary combustion oxidant sectors through which a pressurized cold primary combustion oxidant stream flows toward the boiler, the primary combustion oxidant stream having an air pressure greater than that of the secondary combustion oxidant stream and the flue gas stream;

wherein two of the at least two primary combustion oxidant sectors are positioned adjacent to both the flue gas side and to the at least one secondary combustion oxidant sector; and wherein the at least one secondary combustion oxidant sector is located between the at least two primary combustion oxidant sectors.

9. The oxidant preheater internal arrangement as claimed in claim 8, comprising two secondary combustion oxidant sectors.

10. The oxidant preheater internal arrangement as claimed in claim 9, comprising three primary combustion oxidant sectors.

11. The oxidant preheater internal arrangement as claimed in claim 8, wherein the primary combustion oxidant stream has an air pressure between +40 to +45 inches water gauge, the secondary combustion oxidant stream has an air pressure between +20 to +25 inches water gauge and the flue gas stream has an air pressure between 0 to −5 inches water gauge.

12. A system for warm-recycle oxy-fuel combustion comprising:
- an oxidant preheater for recycling waste heat from a boiler and cooling flue gas from the boiler, the oxidant preheater having an internal arrangement as claimed in claim 8;
- a primary oxidant fan for feeding primary oxidant flow to the oxidant preheater positioned upstream from the oxidant heater; and
- a primary oxidant mixer for introducing an oxidant into the primary combustion oxidant stream positioned downstream from the oxidant heater.

13. The system for warm-recycle oxy-fuel combustion as claimed in claim 12, wherein the oxidant preheater comprises two secondary combustion oxidant sectors.

14. The system for warm-recycle oxy-fuel combustion as claimed in claim 12, wherein the oxidant introduced into the primary combustion oxidant stream is pure oxygen or atmospheric air.

15. The system for warm-recycle oxy-fuel combustion as claimed in claim 14, wherein oxygen is introduced into the primary combustion oxidant stream and before it is introduced the oxygen is preheated.

16. The system for warm recycle oxy-fuel combustion as claimed in claim 12, wherein the primary combustion oxidant stream has a pressure of about +40 to +45 inches water gauge, the secondary combustion oxidant stream has a pressure of about +20 to +25 inches water gauge and the flue gas stream has a pressure of about 0 to −5 inches water gauge.

17. The system for warm recycle oxy-fuel combustion as claimed in claim 12, comprising three primary combustion oxidant sectors.

18. The system for warm recycle oxy-fuel combustion as claimed in claim 12, further comprising:
- a secondary oxidant fan for feeding secondary oxidant flow to the oxidant preheater positioned upstream from the oxidant heater; and
- a secondary oxidant mixer for introducing an oxidant into the secondary combustion oxidant stream positioned upstream from the oxidant preheater and downstream from the secondary oxidant fan.

19. The system for warm-recycle oxy-fuel combustion as claimed in claim 18, wherein the secondary oxidant fan operates at a temperature of at least 300° F. and the primary oxidant fan operates at a temperature of 170° F. or lower.

20. The system for warm-recycle oxy-fuel combustion as claimed in claim 19, wherein after passing through the oxidant preheater the secondary combustion oxidant stream flows to a windbox which is connected to the boiler, and wherein after passing through the oxidant heater, the primary combustion oxidant stream flows to a coal pulverizer.

21. The system for warm-recycle oxy-fuel combustion as claimed in claim 20, further comprising:
- a particulate removal unit for removing particulate matter from the secondary combustion oxidant stream position upstream from the secondary oxidant fan;
- an analytical quality control services (AQCS) unit located on an intermediate flue gas stream; and
- a portion of the flue gas stream which exits the oxidant heater, wherein the portion is divided and forms the secondary combustion oxidant stream as well as the intermediate flu gas stream,
- wherein after passing through the AQCS unit, the intermediate flue gas stream is divided and forms the primary combustion oxidant stream, and a compression and purification stream which leads to a compression and purification unit.

* * * * *